(12) United States Patent
Dugger et al.

(10) Patent No.: US 12,141,711 B2
(45) Date of Patent: Nov. 12, 2024

(54) TRAINING OR USING SETS OF EXPLAINABLE MACHINE-LEARNING MODELING ALGORITHMS FOR PREDICTING TIMING OF EVENTS

(71) Applicant: EQUIFAX INC., Atlanta, GA (US)

(72) Inventors: Jeffery Dugger, Atlanta, GA (US); Michael McBurnett, Cumming, GA (US)

(73) Assignee: Equifax Inc., Atlanta, GA (US)

( * ) Notice: Subject to any disclaimer, the term of this patent is extended or adjusted under 35 U.S.C. 154(b) by 1045 days.

(21) Appl. No.: 17/052,672

(22) PCT Filed: May 10, 2019

(86) PCT No.: PCT/US2019/031806
§ 371 (c)(1),
(2) Date: Nov. 3, 2020

(87) PCT Pub. No.: WO2019/217876
PCT Pub. Date: Nov. 14, 2019

(65) Prior Publication Data
US 2021/0241141 A1    Aug. 5, 2021

Related U.S. Application Data

(60) Provisional application No. 62/669,558, filed on May 10, 2018.

(51) Int. Cl.
*G06N 5/04*     (2023.01)
*G06N 7/01*     (2023.01)
(Continued)

(52) U.S. Cl.
CPC ............. *G06N 5/04* (2013.01); *G06N 7/01* (2023.01); *G06N 20/20* (2019.01); *H04L 41/14* (2013.01); *H04L 67/01* (2022.05)

(58) Field of Classification Search
CPC . G06N 5/04; G06N 20/20; G06N 7/01; H04L 67/01; H04L 41/14
See application file for complete search history.

(56) References Cited

U.S. PATENT DOCUMENTS 8,843,423 B2 *   9/2014   Chu ..................... G06N 5/025
                                                  706/45
9,699,049 B2 *   7/2017   Gupta .................. H04L 41/149
(Continued)

FOREIGN PATENT DOCUMENTS

CA         2865873 A1 * 10/2013 ............. G06F 17/10
CN       108469180 A  *  8/2018 ............. F27B 21/00
(Continued)

OTHER PUBLICATIONS

Australian Application No. AU2019264923, "First Examination Report", mailed Aug. 11, 2023, 3 pages.
(Continued)

*Primary Examiner* — David E Choi
(74) *Attorney, Agent, or Firm* — Kilpatrick Townsend & Stockton LLP

(57) ABSTRACT

Certain aspects involve building timing-prediction models for predicting timing of events that can impact one or more operations of machine-implemented environments. For instance, a computing system can generate program code executable by a host system for modifying host system operations based on the timing of a target event. The program code, when executed, can cause processing hardware to a compute set of probabilities for the target event by applying a set of trained timing-prediction models to predictor variable data. A time of the target event can be computed from the set of probabilities. To generate the program code, the computing system can build the set of timing-prediction models from training data. Building each timing-prediction model can include training the timing- (Continued)

prediction model to predict one or more target events for a different time bin within the training window. The computing system can generate and output program code implementing the models' functionality.

20 Claims, 8 Drawing Sheets

(51) Int. Cl.
  *G06N 20/20* (2019.01)
  *H04L 41/14* (2022.01)
  *H04L 67/01* (2022.01)

(56) References Cited

U.S. PATENT DOCUMENTS

| | | | | |
|---|---|---|---|---|
| 10,817,801 | B2* | 10/2020 | Piche | G06N 7/01 |
| 2008/0208784 | A1* | 8/2008 | Hill | G16B 5/00 |
| | | | | 706/46 |
| 2008/0250265 | A1 | 10/2008 | Chang et al. | |
| 2011/0112997 | A1* | 5/2011 | Sabe | G06N 20/00 |
| | | | | 706/12 |
| 2013/0103624 | A1* | 4/2013 | Thieberger | G06N 20/00 |
| | | | | 706/12 |
| 2016/0071023 | A1* | 3/2016 | Eicher | G06N 5/025 |
| | | | | 706/12 |
| 2017/0293269 | A1* | 10/2017 | Sharma | G05B 13/028 |
| 2018/0005140 | A1 | 1/2018 | Chittilappilly et al. | |
| 2018/0096253 | A1 | 4/2018 | Goldstein et al. | |
| 2018/0113482 | A1* | 4/2018 | Vitullo | G06N 20/20 |

FOREIGN PATENT DOCUMENTS

| | | | | |
|---|---|---|---|---|
| CN | 110365503 | A * | 10/2019 | G06N 20/10 |
| WO | WO-2015030606 | A2 * | 3/2015 | G06N 3/049 |
| WO | 2017212225 | A1 | 12/2017 | |

OTHER PUBLICATIONS

European Patent Application No. 19799729.9, "Extended European Search Report", Mar. 2, 2022, 11 pages.
PCT/US2019/031806, "International Preliminary Report on Patentability", Nov. 19, 2020, 9 pages.
PCT/US2021/072359, "International Search Report and Written Opinion", Mar. 4, 2022.
Wang, et al., "Machine Learning for Survival Analysis : A Survey", Arxiv. Org, Cornell University Library,201 Olin Library Cornell University, Aug. 15, 2017, pp. 1-39.
"Wavelet Analysis of Financial Data", MathWorks, Available Online at https://www.mathworks.com/help/wavelet/examples/wavelet-analysis-of-financial data.html, Accessed from Internet on: Aug. 4, 2020, 10 pages.
U.S. Appl. No. 62/669,558, Training Sets of Explainable Machine-Learning Modeling Algorithms for Predicting Timing of Events, May 10, 2018, 50 pages.
Belloti, et al., "Forecasting and Stress Testing Credit Card Default Using Dynamic Models", International Journal of Forecasting, vol. 29, No. 4, Oct.-Dec. 2013, pp. 563-574.
Burrus, et al., "Introduction to Wavelets and Wavelet Transform-A Primer", La Recherche, vol. 67, Prentice Hall, Jan. 1998, 290 pages.
Dirick, et al., "Time to Default in Credit Scoring Using Survival Analysis: A Benchmark Study", Journal of the Operational Research Society, vol. 68, No. 6, 2017, pp. 652-665.
PCT/US2019/031806, "International Search Report and Written Opinion", Sep. 4, 2019, 12 pages.
Rioul, et al., "Wavelets and Signal Processing", IEEE Signal Processing Magazine, Oct. 1991, pp. 14-38.
Samia, et al., "Accuracy and Conservatism of VaR Models: A Wavelet Decomposed VaR Approach Versus Standard ARMA-GARCH Method", International Journal of Economics and Finance, vol. 1, No. 2, Aug. 2009, pp. 174-184.
Strang, "Wavelet Transforms Versus Fourier Transforms", Bulletin of the American Mathematical Society, vol. 28, No. 2, Apr. 1993, pp. 288-305.
Tan, "Financial Time Series Forecasting Using Improved Wavelet Neural Network", Master's Thesis, May 31, 2009, 113 pages.
Vetterli, et al., "Wavelets and Subband Coding", Prentice Hall PTR, 1995, 522 pages.
Zhao, et al., "Classification Tree Methods for Panel Data Using Wavelet-Transformed Time Series", Computational Statistics and Data Analysis, vol. 127, 2018, pp. 204-216.
Rodriguez, G., "Lecture Notes on Generalized Linear Models," Princeton University, 2010.
Indian Patent Application No. 202037052941, "First Examination Report", Jul. 27, 2022, 6 pages.
Canadian Application No. CA3,098,457, Office Action, Mailed On Dec. 13, 2023, 5 pages.
European Application No. EP19799729.9, Office Action, Mailed On Nov. 2, 2023, 2 pages.
Aggarwal et al., "Two Birds with One Network: Unifying Failure Event Prediction and Time-to-failure Modeling", IEEE International Conference On 131e Data (Big Data), IEEE,, 2018, pp. 1308-1317.
Bao et al., "A Deep Learning Framework for Financial Time Series Using Stacked Autoencoders and Long-short Term Memory", PLOS ONE, vol. 12, No. 7 Available Online at: https://journals.plos.org/plosone/article?id=10.1371/journal.pone.0180944, 2017, 24 pages.
Cornejo-Bueno et al., "Efficient Prediction of Low-Visibility Events at Airports Using Machine-Learning Regression", Boundary Layer Meteorology, Reidel, Dordrecht, NL, 2017, pp. 349-370.
Hong et al., "Remaining Useful Life Prediction Using Time-Frequency Feature and Multiple Recurrent Neural Networks", 24th IEEE International Conference on Emerging Technologies and Factory Automation (ETFA), 2019, pp. 916-923.
Australian Application No. AU2019264923 , "Second Examination Report", Feb. 29, 2024, 3 pages.
Wang et al., "Machine Learning for Survival Analysis: A Survey", ACM Computing Surveys, vol. 51, No. 6, Aug. 15, 2017, pp. 1-39.

* cited by examiner

TRAINING OR USING SETS OF EXPLAINABLE MACHINE-LEARNING MODELING ALGORITHMS FOR PREDICTING TIMING OF EVENTS

CROSS REFERENCE TO RELATED APPLICATIONS

This application is a 371 application of PCT Application No. PCT/US2019/031806, filed May 10, 2019, which claims the benefit of priority of and to U.S. Provisional Application No. 62/669,558, filed on May 10, 2018, both of which are incorporated herein by reference in their entireties.

TECHNICAL FIELD

The present disclosure relates generally to artificial intelligence. More specifically, but not by way of limitation, this disclosure relates to systems that can train sets of explainable machine-learning modeling algorithms for predicting timing of events that can impact machine-implemented operating environments.

BACKGROUND

In machine learning, machine-learning modeling algorithms can be used to perform one or more functions (e.g., acquiring, processing, analyzing, and understanding various inputs in order to produce an output that includes numerical or symbolic information). For instance, machine-learning techniques can involve using computer-implemented models and algorithms (e.g., a convolutional neural network, a support vector machine, etc.) to simulate human decision-making. In one example, a computer system programmed with a machine-learning model can learn from training data and thereby perform a future task that involves circumstances or inputs similar to the training data. Such a computing system can be used, for example, to recognize certain individuals or objects in an image, to simulate or predict future actions by an entity based on a pattern of interactions to a given individual, etc.

SUMMARY

Certain aspects involve generating modeling algorithms usable for predicting timing of events that can impact machine-implemented operating environments. For instance, a computing system, such as a development system, can generate program code that is executable by a host system for modifying one or more host system operations based on the timing of a target event. The program code, when executed, can cause processing hardware to a compute set of probabilities for the target event by applying a set of trained timing-prediction models to predictor variable data. The program code, when executed, can also cause the processing hardware to compute a time of the target event from the set of probabilities. To generate the program code, the computing system (e.g., a development system) can access training data having predictor data samples and corresponding response data samples for a training window. The computing system can build the set of timing-prediction models from the training data. Building each timing-prediction model can include training the timing-prediction model to predict one or more target events for a different time bin within the training window. In some aspects, different time bins used to build different timing-prediction models may be overlapping. The computing system can generate the program code that implements functionality of the models, and can output the program code to the host system.

DETAILED DESCRIPTION

Figure 1:
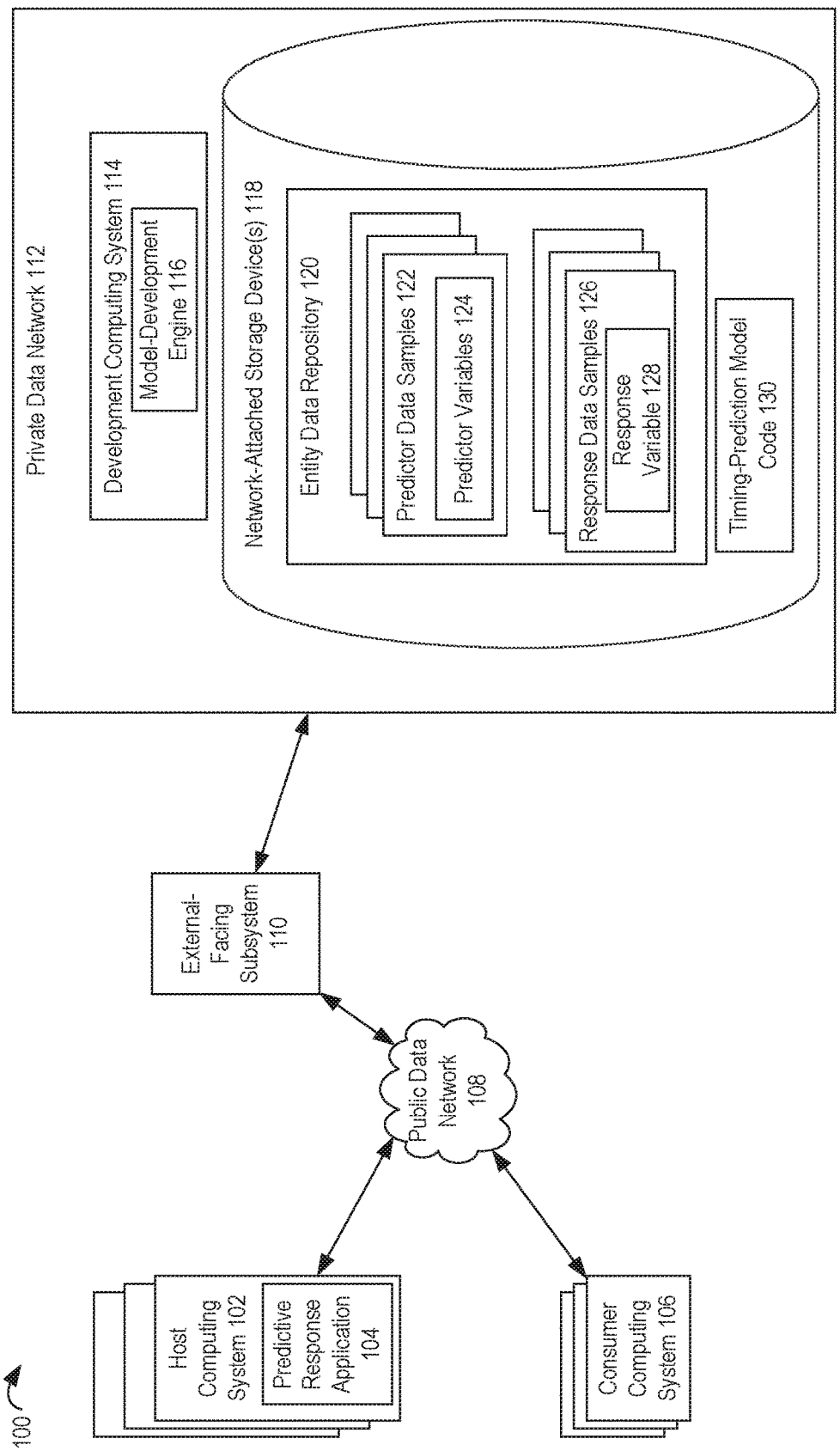
FIG. 1 is a block diagram depicting an example of a computing environment in which sets of explainable machine-learning modeling algorithms for predicting timing of events and thereby modifying one or more host system operations, according to certain aspects of the present disclosure.

Certain aspects and features of the present disclosure involve training and applying a set of multiple modeling algorithms to predictor variable data and thereby estimating a time period in which a target event (e.g., an adverse action) of interest will occur. Modeling algorithms include, for example, binary prediction algorithms that involve models such as neural networks, support vector machines, logistic regression, etc. Each modeling algorithm can be trained to predict, for example, an adverse action based on data from a particular time bin within a time window encompassing multiple periods. An automated modeling system can use the set of modeling algorithms to perform a variety of functions including, for example, utilizing various independent variables and computing an estimated time period in which predicted response, such as an adverse action or other target event, will occur. This timing information can be used to modify a machine-implemented operating environment to account for the occurrence of the target event.

For instance, an automated modeling system can apply different modeling algorithms to predictor variable data in a given observation period to predict (either directly or indirectly) the presence of an event in different time bins encompassed by a performance window. In some aspects, a probability of the event's occurrence can be computed either directly from a survivability model in the modeling algorithm or derived from the survivability model's output. If a modeling algorithm for a particular time bin is used to compute the highest probability of the adverse event, the automated modeling system can select that particular time bin as the estimated time period in which the predicted response will occur.

In some aspects, a model-development environment can train the set of modeling algorithms. The model-development environment can generate the set of machine-learning models from a set of training data for a particular training window, such as a 24-month period for which training data is available. The training window can include multiple time bins, where each time bin is a time period and data samples representing observations occurring in that time period are assigned to that time bin (i.e., indexed by time bin). In a simplified example, a training window includes at least two time bins. The model-development environment trains a first modeling algorithm, which involves a machine-learning model, to predict a timing of an event in the first time bin based on the training data. The model-development environment trains a second modeling algorithm, which also involves a machine-learning model, to predict a timing of an event in the second time bin based on the training data. In some aspects, the second time bin can encompass or otherwise overlap the first time. For instance, the first time bin can include the first three months of the training window, and the second time bin can include the first six months of the training window. In additional or alternative aspects, the model-development environment enforces a monotonicity constraint on the training process for each machine-learning model in each time bin. In the training process, the model-development environment trains each machine-learning model to compute the probability of an adverse action occurring if a certain set of predictor variable values (e.g., consumer attribute values) are encountered.

Continuing with this example, the model-development environment can apply the trained set of models to compute an estimated timing of an adverse action. For instance, the model-development environment can receive predictor variable data for a given entity. The model-development environment can compute a first adverse action probability by applying the first machine-learning model to the predictor variable data. For instance, the first adverse action probability, which is generated from the training data in a three-month period from the training window, can indicate a probability of an adverse action occurring within the first three months of a target window. The model-development environment can compute a second adverse action probability by applying the second machine-learning model to the predictor variable data. For instance, the second adverse action probability, which is generated from the training data in a six-month period from the training window, can indicate a probability of an adverse action occurring within the second six months of a target window. The model-development environment can determine that the second adverse action probability is greater than the first adverse action probability. The model-development environment can output, based on the second adverse action probability being greater than the first adverse action probability, an adverse action timing prediction. The adverse action timing prediction can indicate that an adverse action will occur after the first three months of the target window and before the six-month point in the target window.

Certain aspects can include operations and data structures with respect to neural networks or other models that improve how computing systems service analytical queries or otherwise update machine-implemented operating environments. For instance, a particular set of rules are employed in the training of timing-prediction models that are implemented via program code. This particular set of rules allow, for example, different models to be trained over different timing windows, for monotonicity to be introduced as a constraint in the optimization problem involved in the training of the models, or both. Employment of these rules in the training of these computer-implemented models can allow for more effective prediction of the timing of certain events, which can in turn facilitate the adaptation of an operating environment based on that timing prediction (e.g., modifying an industrial environment based on predictions of hardware failures, modifying an interactive computing environment based on risk assessments derived from the predicted timing of adverse events, etc.). Thus, certain aspects can effect improvements to machine-implemented operating environments that are adaptable based on the timing of target events with respect to those operating environments.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Example of a Computing Environment for Implementing Certain Aspects

Referring now to the drawings, FIG. 1 is a block diagram depicting an example of a computing system 100 in which a development computing system 114 trains timing-prediction models that are used by one or more host computing systems. FIG. 1 depicts examples of hardware components of a computing system 100, according to some aspects. The numbers of devices depicted in FIG. 1 are provided for illustrative purposes. Different numbers of devices may be used. For example, while various elements are depicted as single devices in FIG. 1, multiple devices may instead be used.

The computing system 100 can include one or more host computing systems 102. A host computing system 102 can communicate with one or more of a consumer computing system 106, a development computing system 114, etc. For example, a host computing system 102 can send data to a target system (e.g., the consumer computing system 106, the development computing system 114, the host computing system 102, etc.) to be processed, may send signals to the target system to control different aspects of the computing environment or the data it is processing, or some combination thereof. A host computing system 102 can interact with the development computing system 114, the host computing system 102, or both via one or more data networks, such as a public data network 108.

A host computing system 102 can include any suitable computing device or group of devices, such as (but not limited to) a server or a set of servers that collectively operate as a server system. Examples of host computing systems 102 include a mainframe computer, a grid computing system, or other computing system that executes an automated modeling algorithm, which uses timing-prediction models with learned relationships between independent variables and the response variable. For instance, a host computing system 102 may be a host server system that includes one or more servers that execute a predictive response application 104 and one or more additional servers that control an operating environment. Examples of an operating environment include (but are not limited to) a website or other interactive computing environment, an industrial or manufacturing environment, a set of medical equipment, a power-delivery network, etc. In some aspects, one or more host computing systems 102 may include network computers, sensors, databases, or other devices that may transmit or otherwise provide data to the development computing system 114. For example, the computing devices 102a-c may include local area network devices, such as routers, hubs, switches, or other computer networking devices.

In some aspects, the host computing system 102 can execute a predictive response application 104, which can include or otherwise utilize timing-prediction model code 130 that has been optimized, trained, or otherwise developed using the model-development engine 116, as described in further detail herein. In additional or alternative aspects, the host computing system 102 can execute one or more other applications that generate a predicted response, which describes or otherwise indicate a predicted behavior associated with an entity. Examples of an entity include a system, an individual interacting with one or more systems, a business, a device, etc. These predicted response outputs can be computed by executing the timing-prediction model code 130 that has been generated or updated with the model-development engine 116.

The computing system 100 can also include a development computing system 114. The development computing system 114 may include one or more other devices or subsystems. For example, the development computing system 114 may include one or more computing devices (e.g., a server or a set of servers), a database system for accessing the network-attached storage devices 118, a communications grid, or both. A communications grid may be a grid-based computing system for processing large amounts of data.

The development computing system 114 can include one or more processing devices that execute program code stored on a non-transitory computer-readable medium. The program code can include a model-development engine 116. Timing-prediction model code 130 can be generated or updated by the model-development engine 116 using the predictor data samples 122 and the response data samples 126. For instance, as described in further detail with respect to the examples of FIGS. 2 and 3, the model-development engine 116 can use the predictor data samples 122 and the response data samples 126 to learn relationships between predictor variables 124 and one or more response variables 128.

The model-development engine 116 can generate or update the timing-prediction model code 130. The timing-prediction model code 130 can include program code that is executable by one or more processing devices. The program code can include a set of modeling algorithms. A particular modeling algorithm can include one or more functions for accessing or transforming input predictor variable data, such as a set of attribute values for a particular individual or other entity, and one or more functions for computing the probability of a target event, such as an adverse action or other event of interest. Functions for computing the probability of target event can include, for example, applying a trained machine-learning model or other suitable model to the attribute values. The trained model can be a binary prediction model. The program code for computing the probability can include model structures (e.g., layers in a neural network), model parameter values (e.g., weights applied to nodes of a neural network, etc.).

The development computing system 114 may transmit, or otherwise provide access to, timing-prediction model code 130 that has been generated or updated with the model-development engine 116. A host computing systems 102 can execute the timing-prediction model code 130 and thereby compute an estimated time of a target event. The timing-prediction model code 130 can also include program code for computing a timing, within a target window, of an adverse action or other event based on the probabilities from various modeling algorithms that have been trained using the model-development engine 116 and historical predictor data samples 122 and response data samples 126 used as training data.

For instance, computing the timing of an adverse action or other event can include identifying which of the modeling algorithms were used to compute a highest probability for the adverse action or other event. Computing the timing can also include identifying a time bin associated with one of the modeling algorithms that was used to compute the highest probability value (e.g., the first three months, the first six months, etc.). The associated time bin can be the time period used to train the model implemented by the modeling algorithm. The associated time bin can be used to identify a predicted time period, in a subsequent target window for a given entity, in which the adverse action or other event will occur. For instance, if a modeling algorithm has been trained using data in the first three months of a training window, the predicted time period can be between zero and three months of a target window (e.g., defaulting on a loan within the first three months of the loan).

The computing system 100 may also include one or more network-attached storage devices 118. The network-attached storage devices 118 can include memory devices for storing an entity data repository 120 and timing-prediction model code 130 to be processed by the development computing system 114. In some aspects, the network-attached storage devices 118 can also store any intermediate or final data generated by one or more components of the computing system 100.

The entity data repository 120 can store predictor data samples 122 and response data samples 126. The predictor data samples 122 can include values of one or more predictor variables 124. The external-facing subsystem 110 can prevent one or more host computing systems 102 from accessing the entity data repository 120 via a public data network 108. The predictor data samples 122 and response data samples 126 can be provided by one or more host computing systems 102 or consumer computing systems 106, generated by one or more host computing systems 102 or consumer computing systems 106, or otherwise communicated within a computing system 100 via a public data network 108.

For example, a large number of observations can be generated by electronic transactions, where a given observation includes one or more predictor variables (or data from which a predictor variable can be computed or otherwise derived). A given observation can also include data for a response variable or data from which a response variable value can be derived. Examples of predictor variables can include data associated with an entity, where the data describes behavioral or physical traits of the entity, observations with respect to the entity, prior actions or transactions involving the entity (e.g., information that can be obtained from credit files or records, financial records, consumer records, or other data about the activities or characteristics of the entity), or any other traits that may be used to predict the response associated with the entity. In some aspects, samples of predictor variables, response variables, or both can be obtained from credit files, financial records, consumer records, etc.

Network-attached storage devices 118 may also store a variety of different types of data organized in a variety of different ways and from a variety of different sources. For example, network-attached storage devices 118 may include storage other than primary storage located within development computing system 114 that is directly accessible by processors located therein. Network-attached storage devices 118 may include secondary, tertiary, or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

In some aspects, the host computing system 102 can host an interactive computing environment. The interactive computing environment can receive a set of predictor variable data. The received set of predictor variable data is used as input to the timing-prediction model code 130. The host computing system 102 can execute the timing-prediction model code 130 using the set of predictor variable data. The host computing system 102 can output an estimated time of an adverse action (or other event of interest) that is generated by executing the timing-prediction model code 130.

In additional or alternative aspects, a host computing system 102 that is part of a private data network 112 communicates with a third-party computing system that is external to the private data network 112 and that hosts an interactive computing environment. The third-party system can receive, via the interactive computing environment, a set of predictor variable data. The third-party system can provide the set of predictor variable data to the host computing system 102. The host computing system 102 can execute the timing-prediction model code 130 using the set of predictor variable data. The host computing system 102 can transmit, to the third-party system, an estimated time of an adverse action (or other event of interest) that is generated by executing the timing-prediction model code 130.

A consumer computing system 106 can include any computing device or other communication device operated by a user, such as a consumer or a customer. The consumer computing system 106 can include one or more computing devices, such as laptops, smart phones, and other personal computing devices. A consumer computing system 106 can include executable instructions stored in one or more non-transitory computer-readable media. The consumer computing system 106 can also include one or more processing devices that are capable of executing program code to perform operations described herein. In various examples, the consumer computing system 106 can allow a user to access certain online services from a client computing system 106, to engage in mobile commerce with a client computing system 106, to obtain controlled access to electronic content hosted by the client computing system 106, etc.

Communications within the computing system 100 may occur over one or more public data networks 108. In one example, communications between two or more systems or devices can be achieved by a secure communications protocol, such as secure sockets layer ("SSL") or transport layer security ("TLS"). In addition, data or transactional details may be encrypted. A public data network 108 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in a data network.

The computing system 100 can secure communications among different devices, such as host computing systems 102, consumer computing systems 106, development computing systems 114, host computing systems 102, or some combination thereof. For example, the client systems may interact, via one or more public data networks 108, with various one or more external-facing subsystems 110. Each external-facing subsystem 110 includes one or more computing devices that provide a physical or logical subnetwork (sometimes referred to as a "demilitarized zone" or a "perimeter network") that expose certain online functions of the computing system 100 to an untrusted network, such as the Internet or another public data network 108.

Each external-facing subsystem 110 can include, for example, a firewall device that is communicatively coupled to one or more computing devices forming a private data network 112. A firewall device of an external-facing subsystem 110 can create a secured part of the computing system 100 that includes various devices in communication via a private data network 112. In some aspects, as in the example depicted in FIG. 1, the private data network 112 can include a development computing system 114, which executes a model-development engine 116, and one or more network-attached storage devices 118, which can store an entity data repository 120. In additional or alternative aspects, the private data network 112 can include one or more host computing systems 102 that execute a predictive response application 104.

In some aspects, by using the private data network 112, the development computing system 114 and the entity data repository 120 are housed in a secure part of the computing system 100. This secured part of the computing system 100 can be an isolated network (i.e., the private data network 112) that has no direct accessibility via the Internet or another public data network 108. Various devices may also interact with one another via one or more public data networks 108 to facilitate electronic transactions between users of the consumer computing systems 106 and online services provided by one or more host computing systems 102.

In some aspects, including the development computing system 114 and the entity data repository 120 in a secured part of the computing system 100 can provide improvements over conventional architectures for developing program code that controls or otherwise impacts host system operations. For instance, the entity data repository 120 may include sensitive data aggregated from multiple, independently operating contributor computing systems (e.g., failure reports gathered across independently operating manufacturers in an industry, personal identification data obtained by or from credit reporting agencies, etc.). Generating timing-prediction model code 130 that more effectively impacts host system operations (e.g., by accurately computing timing of a target event) can require access to this aggregated data. However, it may be undesirable for different, independently operating host computing systems to access data from the entity data repository 120 (e.g., due to privacy concerns). By building timing-prediction model code 130 in a secured part of a computing system 100 and then outputting that timing-prediction model code 130 to a particular host computing system 102 via the external-facing subsystem 110, the particular host system 102 can realize the benefit of using higher quality timing-prediction models (i.e., model built using training data from across the entity data repository 120) without the security of the entity data repository 120 being compromised.

Host computing systems 102 can be configured to provide information in a predetermined manner. For example, host computing systems 102 may access data to transmit in response to a communication. Different host computing systems 102 may be separately housed from each other device within the computing system 100, such as development computing system 114, or may be part of a device or system. Host computing systems 102 may host a variety of different types of data processing as part of the computing system 100. Host computing systems 102 may receive a variety of different data from the computing devices 102a-c, from the development computing system 114, from a cloud network, or from other sources.

Examples of Generating Sets of Timing-Prediction Models

In one example, the model-development engine 116 can access training data that includes the predictor data samples 122 and response data samples 126. The predictor data samples 122 and response data samples 126 include, for example, entity data for multiple entities, such as entities or other individuals over different time bins within a training window. Response data samples 126 for a particular entity indicate whether or not an event of interest, such as an adverse action, has occurred within a given time period. Examples of a time bin include a month, a quarter of a performance window, a biannual period, or any other suitable time period. An example of an event of interest is a default, such as being 90+ days past due on a specific account.

If the response data samples 126 for an entity indicate the occurrence of the event of interest in a particular time bin (e.g., a month), the model-development engine 116 can count the number of time bins (e.g., months) until the first time the event occurs in the training window. The model-development engine 116 can assign, to this entity, a variable t equal to the number of time bins (months). The performance window can have a defined starting time such as, for example, a date an account was opened, a date that the entity defaults on a separate account, etc. The performance window can have a defined ending time, such as 24 months after the defined starting time. If the response data samples 126 for an entity indicate the non-occurrence of the event of interest in the training window, the model-development engine 116 can set t to any time value that occurs beyond the end of the training window.

The model-development engine 116 can select predictor variables 124 in any suitable manner. In some aspects, the model-development engine 116 can add, to the entity data repository 120, predictor data samples 122 with values of one or more predictor variables 124. One or more predictor variables 124 can correspond to one or more attributes measured in an observation window, which is a time period preceding the training window. For instance, predictor data samples 122 can include values indicating actions performed by an entity or observations of the entity. The observation window can include data from any suitable time period. In one example, an observation window has a length of one month. In another example, an observation window has a length of multiple months.

In some aspects, training a timing-prediction model used by a host computing system 102 can involve ensuring that the timing-prediction model provides a predicted response, as well as an explanatory capability. Certain predictive response applications 104 require using models having an explanatory capability. An explanatory capability can involve generating explanatory data such as adverse action codes (or other reason codes) associated with independent variables that are included in the model. This explanatory data can indicate an effect, an amount of impact, or other contribution of a given independent variable with respect to a predicted response generated using an automated modeling algorithm.

The model-development engine 116 can use one or more approaches for training or updating a given modeling algorithm. Examples of these approaches can include overlapping survival models, non-overlapping hazard models, and interval probability models.

Survival analysis predicts the probability of when an event will occur. For instance, survival analysis can compute the probability of "surviving" up to an instant of time t at which an adverse event occurs. In a simplified example, survival could include the probability of remaining "good" on a credit account until time t, i.e., not being 90 days past due or worse on an account. The survival analysis involves censoring, which occurs when the event of interest has not happened for the period in which training data is analyzed and the models are built. Right-censoring means that the event occurs beyond the training window, if at all. In the example above, the right-censoring is equivalent to an entity remaining "good" throughout the training window.

Survival analysis involves a survival function, a hazard function, and a probability function. In one example, the survival function predicts the probability of the non-occurrence of an adverse action (or other event) up to a given time. In this example, the hazard function provides the rate of occurrence of the adverse action over time, which can indicate a probability of the adverse action occurring given that a particular length of time has occurred without occurrence of the adverse action. The probability function shows the distribution of times at which the adverse action occurs.

Equation (1) gives an example of a mathematical definition of a survival function:

$$s(t_j) = P(T > t_j). \tag{1}$$

In Equation (1), $t_j$ corresponds to the time period in which an entity experiences the event of interest. In a simplified example, an event of interest could be an event indicating a risk associated with the entity, such as a default on a credit account by the entity.

If the survival function is known, the hazard function can be computed with Equation (2):

$$h(t_j) = \frac{S(t_{j-1}) - S(t_j)}{S(t_{j-1})}. \tag{2}$$

If the hazard function is known, the survival function can be computed with Equation (3):

$$s(t_j) = \prod_{k=1}^{j}[1 - h(t_k)]. \tag{3}$$

If both the hazard and survival functions are known, the probability density function can be computed with Equation (4):

$$f(t_j) = h(t_j)S(t_{j-1}). \quad (4)$$

The overlapping survival approach involves building the set of models on overlapping time intervals. The non-overlapping hazard approach approximates the hazard function with a set of constant hazard rates in different models on disjoint time intervals. The interval probability approach estimates the probability function directly. Time intervals can be optimally selected in these various approaches.

For instance, in each approach, the model-development engine 116 can partition a training window into multiple time bins. For each time bin, the model-development engine 116 can generate, update, or otherwise build a corresponding model to be included in the timing-prediction model code 130. Any suitable time period can be used in the partition of the training window. A suitable time period can depend on the resolution of response data samples 126. A resolution of the data samples can include a granularity of the time stamps for the response data samples 126, such as whether a particular data sample can be matched to a given month, day, hour, etc. The set of time bins can span the training window.

Figure 2:
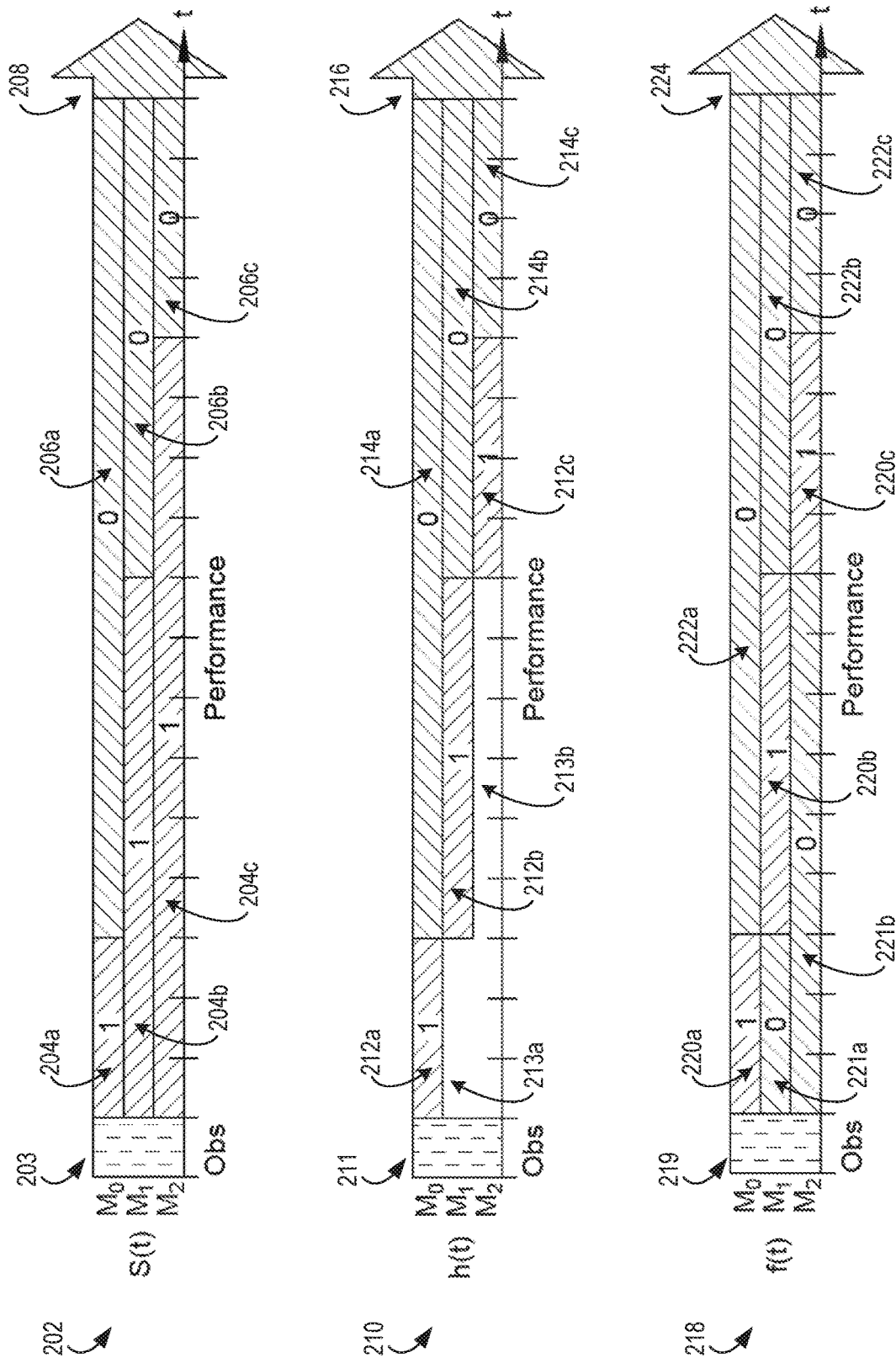
FIG. 2 depicts examples of bar graphs that illustrate modeling approaches for a time-to-event analysis performed by executing timing-prediction model code generated with the computing environment of FIG. 1, according to certain aspects of the present disclosure.

FIG. 2 depicts examples of bar graphs that illustrate modeling approaches for a time-to-event analysis performed by executing timing-prediction model code 130. For instance, an overlap survival approach is represented using the bar graph 202, a non-overlap hazard approach is represented using the bar graph 210, and an interval probability approach is represented using the bar graph 218.

In this example, the model-development engine 116 can be used to build three models ($M_0$, $M_1$, $M_2$) for each approach: S(t), h(t), f(t). Each model can be a binary prediction model predicting whether a response variable will have an output of 1 or 0. The target variable definition can change for each model depending on the approach used. A "1" indicates the entity experienced a target event in a period. For instance, in the bar graph 202 representing a performance window using the overlap survival approach, a "1" value indicating an event's occurrence is included in periods 204a, 204b, and 204c. Similarly, in the bar graph 210 representing a performance window using the non-overlap hazard approach, a "1" value indicating an event's occurrence is included in periods 212a, 212b, and 212c. And in the bar graph 218 representing a performance window using the interval probability approach, a "1" value indicating an event's occurrence is included in periods 220a, 220b, and 220c.

In the examples of FIG. 2, a "0" indicates the entity did not experience the event within the time period. For instance, in the bar graph 202 representing the overlap survival approach, a "0" value indicating an event's non-occurrence is included in periods 206a, 206b, and 206c. Similarly, in the bar graph 210 representing the non-overlap hazard approach, a "0" value indicating an event's non-occurrence is included in periods 214a, 214b, and 214c. And in the bar graph 218 representing the interval probability approach, a "0" value indicating an event's non-occurrence is included in periods 221a, 221b, 222a, 222b, and 222c. In the bar graphs 202, 210, and 218, the respective arrows 208, 216, and 224 pointing towards the right indicates inclusion in the model of entities beyond the time period shown who did not experience the event within the performance window (i.e. censored data).

In these examples, the model-development engine 116 sets a target variable for each model to "1" if the value of t falls within an area visually represented by a right-and-down diagonal pattern in FIG. 2. Otherwise, the model-development engine 116 sets the target variable for each model to "0." Assignments of "1" and "0" to the target variable for each model are illustrated in the bar graph 202 for the overlap survival method (S(t)), the bar graph 210 for the non-overlap hazard method (h(t)) and the bar graph 218 for the interval probability method (f(t)). The performance window for each model contains the combined time periods indicated in right-and-down diagonal pattern and a left-and-up diagonal pattern (e.g., a combination of periods 204a and 206a in bar graph 202, a combination of periods 212a and 214a in bar graph 210, etc.). In the case of the bar graph 210 representing h(t), the time periods 213a and 213b are visually represented as white areas to indicate that no data samples for those entities for which the target event occurred within those time periods were used to build the model (e.g., samples whose values of t lie in the time period 213a were not used to build the model $M_1$ and samples whose values of t lie in the time period 213b were not used to build the model $M_2$).

The overlapping survival model can include modeling a survival function, S(t), directly rather than the underlying hazard function, h(t). In some aspects, this approach is equivalent to building timing-prediction models over various, overlapping time bins. Non-overlapping hazard models represent a step-wise approximation to the hazard function, h(t), where the hazard rate is assumed constant over each interval. In one example, the model-development engine 116 can build non-overlapping hazard models on both individual months and groups of months utilizing logistic regression on each interval independently. Interval probability models attempt to estimate the probability function directly.

The predictor variables 124 used for the model in each approach can be obtained from predictor data samples 122 having time stamps in an observation period. The observation period can occur prior to the training window. In the examples of FIG. 2, the predictor variables 124 are attributes from observation periods 203, 211, and 219, each of which is a single month that precedes the performance window.

The model-development engine 116 can build any suitable binary prediction model, such as a neural network, a standard logistic regression credit model, a tree-based machine learning model, etc. In some aspects, the model-development engine 116 can enforce monotonicity constraints on the models. Enforcing monotonicity constraints on the models can cause the models to be regulatory-compliant. Enforcing monotonicity constraints can include exploratory data analysis, binning, variable reduction, etc. For instance, binning, variable reduction, or some combination thereof can be applied to the training data and thereby cause a model built from the training data to match a predictor/response relationship identified from the exploratory data analysis.

In some aspects, performing a training process that enforces monotonicity constraints enhances computing devices that implement artificial intelligence. The artificial intelligence can allow the same timing-prediction model to be used for determining a predicted response and for generating explanatory data for the independent variables. For example, a timing-prediction model can be used for determining a level of risk associated with an entity, such as an individual or business, based on independent variables predictive of risk that is associated with an entity. Because monotonicity has been enforced with respect to the model, the same timing-prediction model can be used to compute explanatory data describing the amount of impact that each independent variable has on the value of the predicted response. An example of this explanatory data is a reason code indicating an effect or an amount of impact that a given independent variable has on the value of the predicted response. Using these timing-prediction models for computing both a predicted response and explanatory data can allow computing systems to allocate process and storage resources more efficiently, as compared to existing computing systems that require separate models for predicting a response and generating explanatory data.

In the examples depicted in FIG. 2, the models correspond to a survival probability per period for entities in the overlapping survival case, a bad rate (hazard rate) per period for entities in the non-overlapping hazard models, and a probability of bad per period for entities in the interval probability model, which allows for calculating the most probable time at which an event of interest will occur. The model-development engine 116 can use a variable T that is defined as a non-negative random variable representing the time until default occurs. The distribution of default times can be defined by a probability function, $f(t)$.

In some aspects, a value of "1" can represent an event-occurrence in the timing-prediction models. In additional or alternative aspects, the model-development engine 116 can assign a lower score to a higher probability of event-occurrence and assign a higher score to a lower probability of event-occurrence. For example, a credit score can be computed as a probability of non-occurrence of an event ("good") multiplied by 1000, which yields higher credit scores for lower-risk entities. The effects of this choice can be seen in Equations (5), (8), and (11) below.

In the overlap survival approach in FIG. 2, the model-development engine 116 can use the estimated survival function, $S(t_j)$ to compute the remaining functions of interest, including the hazard rate, $h(t_j)$, and the probability function, $f(t_j)$. In this example, the training data set for this approach includes the entire performance window, though other implementations are possible. The index variable j is used to index the models $M_j$. The variable $t_j$ corresponds to the right-most edge of the time bin, in which it is desired to determine whether an entity experiences the event of interest, such as an adverse action (e.g., a default, a component failure, etc.). If an entity experienced the event in this time bin, then the response variable is defined to be "1"; otherwise, the response variable is defined to be "0". A binary classification model (e.g. logistic regression) is trained to generate a score for the time bin specified by model $M_j$. The value of score provided by the model is defined as described above (e.g., with respect to the credit score example). Examples of formulas for implementing this approach are provided in Equations (5)-(7).

$$S(t_j) = \frac{\text{score}_j}{1000}. \tag{5}$$

$$f(t_j) = S(t_{j-1}) - S(t_j). \tag{6}$$

$$h(t_j) = \frac{f(t_j)}{S(t_{j-1})}. \tag{7}$$

For example, if j=0, a corresponding model $M_0$ could be built from time bin $t_0$ of three months, if j=1, a corresponding model $M_1$ could be built from time bin $t_0$ of six months, etc. Tabulating and plotting $S(t_j)$ from a model $M_j$ yields the survival curve. From this tabulation, and defining $S(t_{-1})$=1, $f(t_j)$ and $h(t_j)$ can be calculated according to Equations (6) and (7).

In the non-overlapping hazard approach, the model-development engine 116 can use the estimated hazard rate, $h(t_j)$ to compute the remaining functions of interest, including the survival function, $S(t_j)$, and the probability function, $f(t_j)$. The training data set for each model $M_j$ comprises successive subsets of the original data set. In some aspects, these subsets result from removing entities that were labeled as "1" in all prior models. The variable $t_j$ corresponds to the right-most edge of the time bin, in which it is desired to determine whether an entity experiences the event of interest, such as an adverse action (e.g., a default, a component failure, etc.). If an entity experienced the event in this time bin, then the response variable is defined to be "1"; otherwise, the response variable is defined to be "0". A binary classification model (e.g. logistic regression) is trained to generate a score$_j$ for the time bin specified by model $M_j$. The value of score$_j$ provided by the model is defined as described above (e.g., with respect to the credit score example). Examples of formulas for implementing this approach are provided in Equations (8)-(10).

$$h(t_j) = 1 - \frac{\text{score}_j}{1000}. \tag{8}$$

$$s(t_j) = \prod_{k=1}^{j} [1 - h(t_k)]. \tag{9}$$

$$f(t_j) = h(t_j) S(t_{j-1}). \tag{10}$$

Tabulating and plotting $h(t_j)$ from model $M_j$ yields the hazard curve. From this tabulation, $S(t_j)$ and $f(t_j)$ can be calculated according to Equations (9) and (10), where $S(t_{-1})$=1 as defined before.

In the interval probability approach, the model-development engine 116 can use the estimated probability function $f(t_j)$ to compute the remaining functions of interest, including the survival function, $S(t_j)$, and the hazard rate, $h(t_j)$. In some aspects, the training data set for this approach includes the entire performance window. Unlike the previous two cases, an entity experiencing the event in the time bin bounded by $t_{j-1}$ and $t_j$, yields a response variable of "1"; otherwise, the response variable is "0". A binary classification model (e.g., logistic regression) is trained to generate a score$_j$ for the time bin specified by model $M_j$. The value of score$_j$ provided by the model is defined as described above (e.g., with respect to the credit score example). Examples of formulas for implementing this approach are provided in Equations (11)-(13).

$$f(t_j) = 1 - \frac{\text{score}_j}{1000}. \tag{11}$$

$$S(t_j) = 1 - \sum_{k=1}^{j} f(t_j). \tag{12}$$

$$h(t_j) = \frac{f(t_j)}{S(t_{j-1})}. \tag{13}$$

Tabulating and plotting $f(t_j)$ from model $M_j$ yields the probability distribution curve. From this tabulation, $S(t_j)$ and $h(t_j)$ can then be calculated according to Equations (12) and (13), where $S(t_{-1})$=1 as defined before.

It is noted that the value of score$_j$ as utilized in Equations (5), (8), and (11) is not the same value in each case because the definitions of the data sets and targets are different across the three cases.

Examples of model-estimation techniques that can be used in survival analysis modeling include a parametric approach, a non-parametric approach, and a semi-parametric approach. The parametric approach assumes a specific functional form for a hazard function and estimates parameter values that fit the hazard rate computed by the hazard function to the training data. Examples of probability density functions from which parametric hazard functions are derived are the exponential and Weibull functions. One parametric case can correspond to an exponential distribution, which depends on a single "scale" parameter $\lambda$ that represents a constant hazard rate across the time bins in a training window. A Weibull distribution can offer more flexibility. For example, a Weibull distribution provides an additional "shape" parameter to account for risks that monotonically increase or decrease over time. The Weibull distribution coincides with the exponential distribution if the "shape" parameter of the Weibull distribution has a value of one. Other examples of distributions uses for a parametric approach are the log-normal, log-logistic, and gamma distributions. In various aspects, the parameters for the model can be fit from the data using maximum likelihood.

The Cox Proportional Hazards ("CPH") model is an example of a non-parametric model in survival analysis. This approach assumes that all cases have a hazard function of the same functional form. A predictive regression model provides scale factors for this "baseline" hazard function, hence the name "proportional hazards." These scale factors translate into an exponential factor that transforms a "baseline survival" function into survival functions for the various predicted cases. The CPH model utilizes a special partial likelihood method to estimate the regression coefficients while leaving the hazard function unspecified. This method involves selecting a particular set of coefficients to be a "baseline case" for which the common hazard function can be estimated.

Semi-parametric methods subdivide the time axis into intervals and assume a constant hazard rate on each interval, leading to the Piecewise Exponential Hazards model. This model approximates the hazard function using a step-wise approximation. The intervals can be identically sized or can be optimized to provide the best fit with the fewest models. If the time variable is discrete, a logistic regression model can be used on each interval. In some aspects, the semi-parametric approach provides advantages over the parametric modelling technique and the CPH method. In one example, the semi-parametric approach can be more flexible because the semi-parametric approach does not require the assumption of a fixed parametric form across a given training window.

Figure 3:
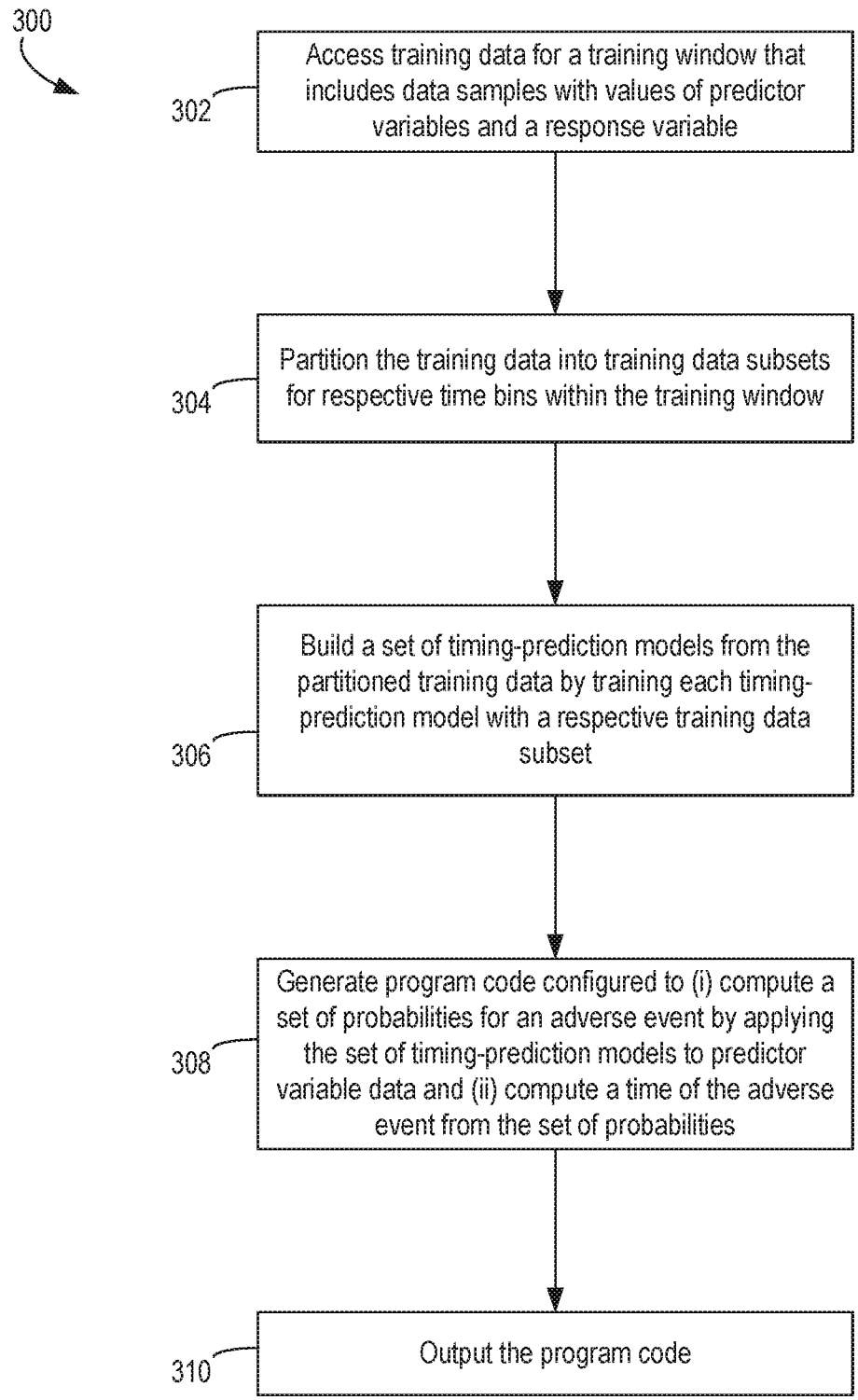
FIG. 3 depicts an example of a process for training a set of multiple modeling algorithms and thereby estimating a time period in which a target event will occur, according to certain aspects of the present disclosure.

FIG. 3 depicts an example of a process 300 for training a set of multiple modeling algorithms and thereby estimating a time period in which a target event will occur. For illustrative purposes, the process 300 is described with reference to implementations described with respect to various examples depicted in FIG. 1. Other implementations, however, are possible. The operations in FIG. 3 are implemented in program code that is executed by one or more computing devices, such as the development computing system 114, the host computing system 102, or some combination thereof. In some aspects of the present disclosure, one or more operations shown in FIG. 3 may be omitted or performed in a different order. Similarly, additional operations not shown in FIG. 3 may be performed.

At block 302, the process 300 can involve accessing training data for a training window that includes data samples with values of predictor variables and a response variable. Each predictor variable can correspond to an action performed by an entity or an observation of the entity. The response variable can have a set of outcome values associated with the entity. The model-development engine 116 can implement block 302 by, for example, retrieving predictor data samples 122 and response data samples 126 from one or more non-transitory computer-readable media.

In some aspects, at block 304, the process 300 can involve partitioning the training data into training data subsets for respective time bins within the training window. For example, the model-development engine 116 can implement block 302 by creating a first training subset having predictor data samples 122 and response data samples 126 with time indices in a first time bin, a second training subset having predictor data samples 122 and response data samples 126 with time indices in a second time bin, etc. In other aspects, block 304 can be omitted.

In some aspects, the model-development engine 116 can identify a resolution of the training data and partition the training data based on the resolution. In one example, the model-development engine 116 can identify the resolution based on one or more user inputs, which are received from a computing device and specify the resolution (e.g., months, days, etc.). In another example, the model-development engine 116 can identify the resolution based on analyzing time stamps or other indices within the response data samples 126. The analysis can indicate the lowest-granularity time bin among the response data samples 126. For instance, the model-development engine 116 could determine that some data samples have time stamps identifying a particular month, without distinguishing between days, and other data samples have time stamps identifying a particular day from each month. In this example, the model-development engine 116 can use a "month" resolution for the portioning operation, with the data samples having a "day" resolution being grouped based on their month.

At block 306, the process 300 can involve building a set of timing-prediction models from the partitioned training data by training each timing-prediction model with the training data. In some aspects, the model-development engine 116 can implement block 306 by training each timing-prediction model (e.g., a neural network, logistic regression, tree-based model, or other suitable model) to predict the likelihood of an event (or the event's absence) during a particular time bin or other time period for the timing-prediction model. For instance, a first timing-prediction model can learn, based on the training data, to predict the likelihood of an event occurring (or the event's absence) during a three-month period, and a second timing-prediction model can learn, based on the training data, to predict the likelihood of the event occurring (or the event's absence) during a six-month period.

In additional or alternative aspects, the model-development engine 116 can implement block 306 by selecting a relevant training data subset and executing a training process based on the selected training data subset. For instance, if a hazard function approach is used, the model-development engine 116 can train a neural network, logistic regression, tree-based model, or other suitable model for a first time bin (e.g., 0-3 months) using a subset of the predictor data samples 122 and response data samples 126 having time indices within the first time bin. The model-development engine 116 trains the model to, for example, compute a probability of a response variable value (taken from response data samples 126) based on different sets of values of the predictor variable (taken from the predictor data samples 122).

In some aspects, block 306 involves computing survival functions for overlapping time bins. In additional or alternative aspects, block 306 involves computing hazard functions for non-overlapping time bins.

The model-development engine 116 iterates block 306 for multiple time periods. Iterating block 306 can create a set of timing-prediction models that span the entire training windows. In some aspects, each iteration uses the same set of training data (e.g., using an entire training dataset over a two-year period to predict an event's occurrence or non-occurrence within three months, within six months, within twelve months, and so on). In additional or alternative aspects, such as hazard function approaches, this iteration is performed for each training data subset generated in block 304.

At block 308, the process 300 can involve generating program code configured to (i) compute a set of probabilities for an adverse event by applying the set of timing-prediction models to predictor variable data and (ii) compute a time of the adverse event from the set of probabilities. For example, the model-development engine 116 can update the timing-prediction model code 130 to include various model parameters computed at block 306, to implement various model architectures computed at block 306, or some combination thereof.

In some aspects, computing a time of the adverse event (or other event of interest) at block 308 can involve computing a measure of central tendency with respect to a curve defined by the collection of different timing-prediction models across the set of time bins. For instance, the set of timing-prediction models can be used to compute a set of probabilities of an event's occurrence or non-occurrence over time (e.g., over different time bins). The set of probabilities over time defines a curve. For instance, the collective set of timing-prediction models results in a survival function, a hazard function, or an interval probability function. A measure of central tendency for this curve can be used to identify an estimate of a particular predicted time period for the event of interest (e.g., a single point estimate of expected time-to-default). Examples of measures of central tendency include the mean time-to-event (e.g., area under the survival curve), a median time-to-event corresponding to the time where the survival function equals 0.5, and a mode of the probability function of the curve (e.g., the time at which the maximum value of probability function $f$ occurs). A particular measure of central tendency can be selected based on the characteristics of the data being analyzed. At block 308, a time at which the measure of central tendency occurs can be used as the predicted time of the adverse event or other event of interest. In various aspects, such measures of central tendency can also be used in timing-prediction models involving a survival function, in timing-prediction models involving a hazard function, in timing-prediction models involving an interval probability function, etc.

In aspects involving a timing-prediction model using a survival function, which indicates an event's non-occurrence, the probability of the event's occurrence for a particular time period can be derived from the probability of non-occurrence (e.g. by subtracting the probability of non-occurrence from 1), where the measure of central tendency is used as the probability of non-occurrence. In aspects involving a timing-prediction model using a hazard function, which indicates an event's occurrence, the probability of the event's occurrence for a particular time period can be the measure of central tendency is used as the probability of non-occurrence.

At block 310, the process 300 can involve outputting the program code. For example, the model-development engine 116 can output the program code to a host computing system 102. Outputting the program code can include, for example, storing the program code in a non-transitory computer-readable medium accessible by the host computing system 102, transmitting the program code to the host computing system 102 via one or more data networks, or some combination thereof.

Experimental Examples Involving Certain Aspects

An experimental example involving certain aspects utilized simulated data having 200,000 samples from a set of log-normal distributions. The set of log-normal distributions was generated from a single predictor variable with five discrete values, as computed by the following function:

$$\log(T_i) = \beta x_i + \mathcal{N}(\mu, \sigma). \quad (14)$$

In Equation (14), $\beta=\log(4)$, $\mu=2$, $\sigma=0.25$ and $x_i \in \{0.00, 0.25, 0.5, 0.75, 1.00\}$. The log-normal distribution can be used was used for two reasons: a normal distribution was chosen for the error term because this is typical in a linear regression model, and the logarithm was chosen as the link function to yield only positive values for a time period in which "survival" (i.e., non-occurrence of an event of interest) occurred. Discrete values of a single predictor were chosen to enhance visualization and interpretation of results.

Figure 4:
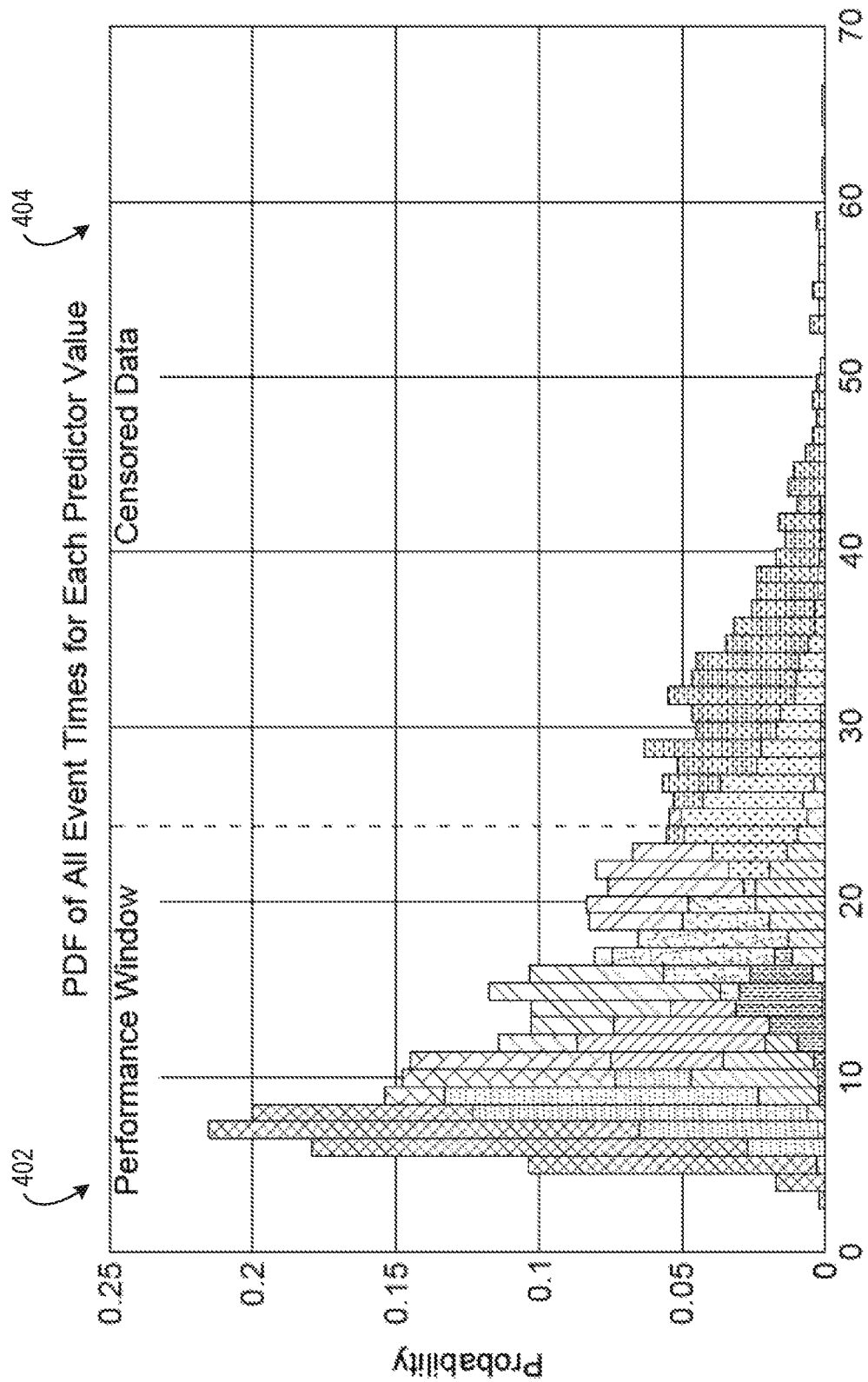
FIG. 4 illustrates simulated data distributions for predictor values, according to certain aspects of the present disclosure.

FIG. 4 illustrates simulated data distributions for each predictor value $x_i$ used in Equation (14). In this example, probability density functions are depicted, with a performance window 402 of 24 months and a censored data 404 beyond the performance window 402.

Figure 5:
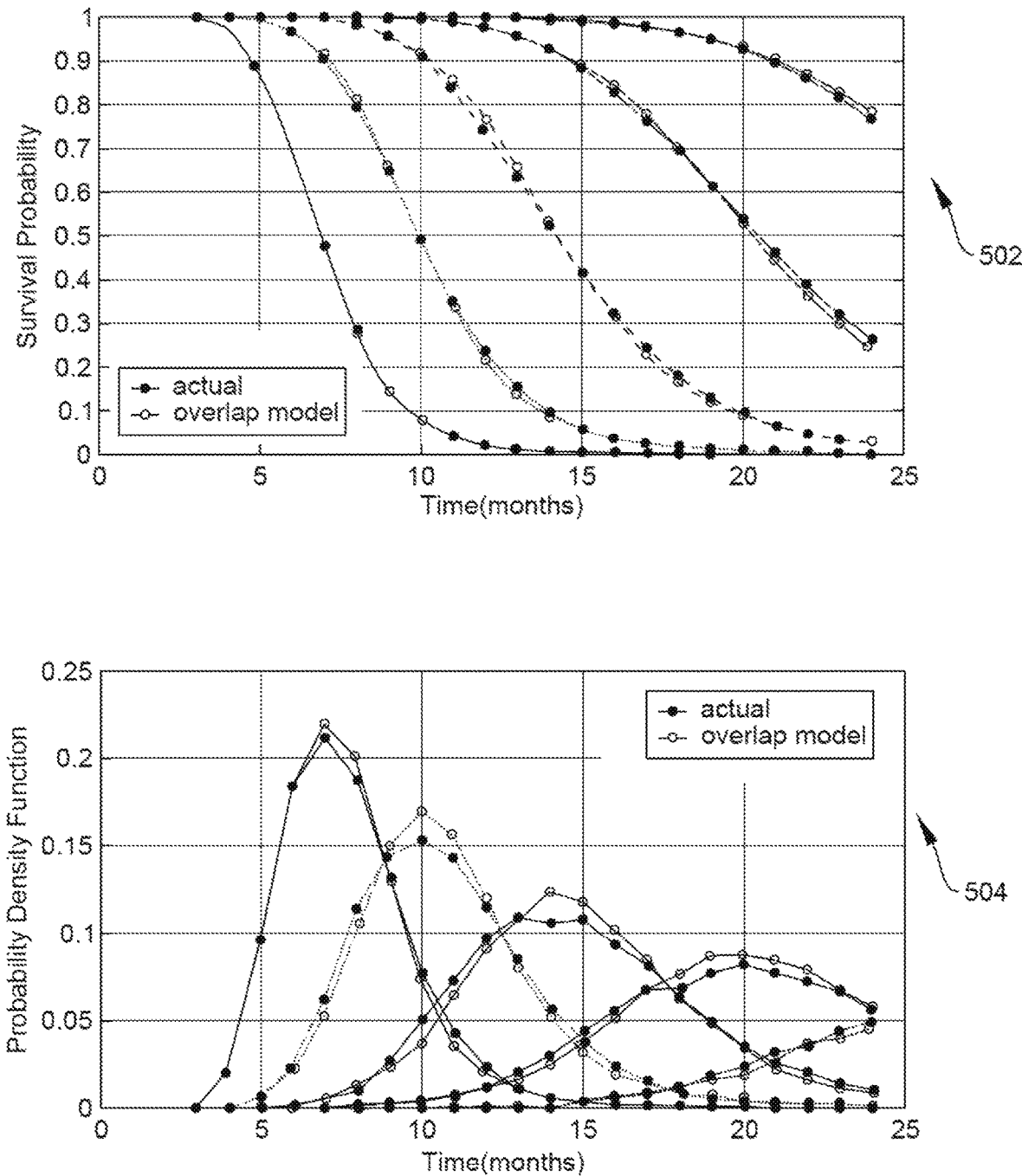
FIG. 5 depicts an example of performance of overlapping survival models used by the computing environment of FIG. 1, according to certain aspects of the present disclosure.

FIG. 5 demonstrates the performance of overlapping survival models on monthly time bins, with the time (in months) as the x-axis in each of graphs 502 and 504. In this example, logistic regression models were built for each month from 3 up to 25. These models yield the survival values for each month, which can be converted into corresponding hazard functions and probability density functions. Graph 502 compares actual and modeled survival functions, with the survival probability being the y-axis. Graph 504 compares actual probability functions with those computed from the modeled survival functions using Equation (6), with the probability density function being the y-axis.

Figure 6:
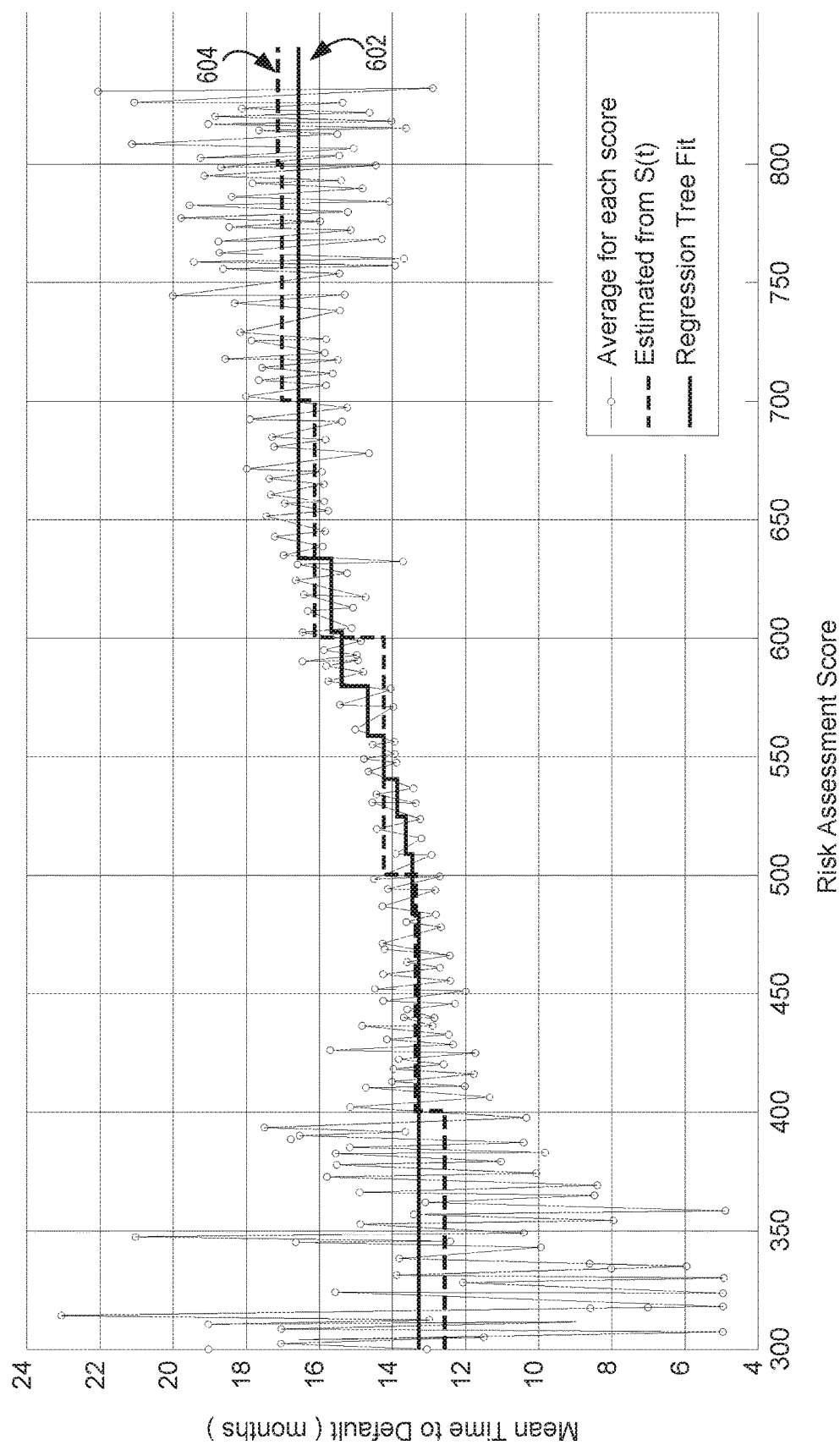
FIG. 6 depicts an example of a relationship between a model target variable and a possible predictor variable, according to certain aspects of the present disclosure.
Figure 7:
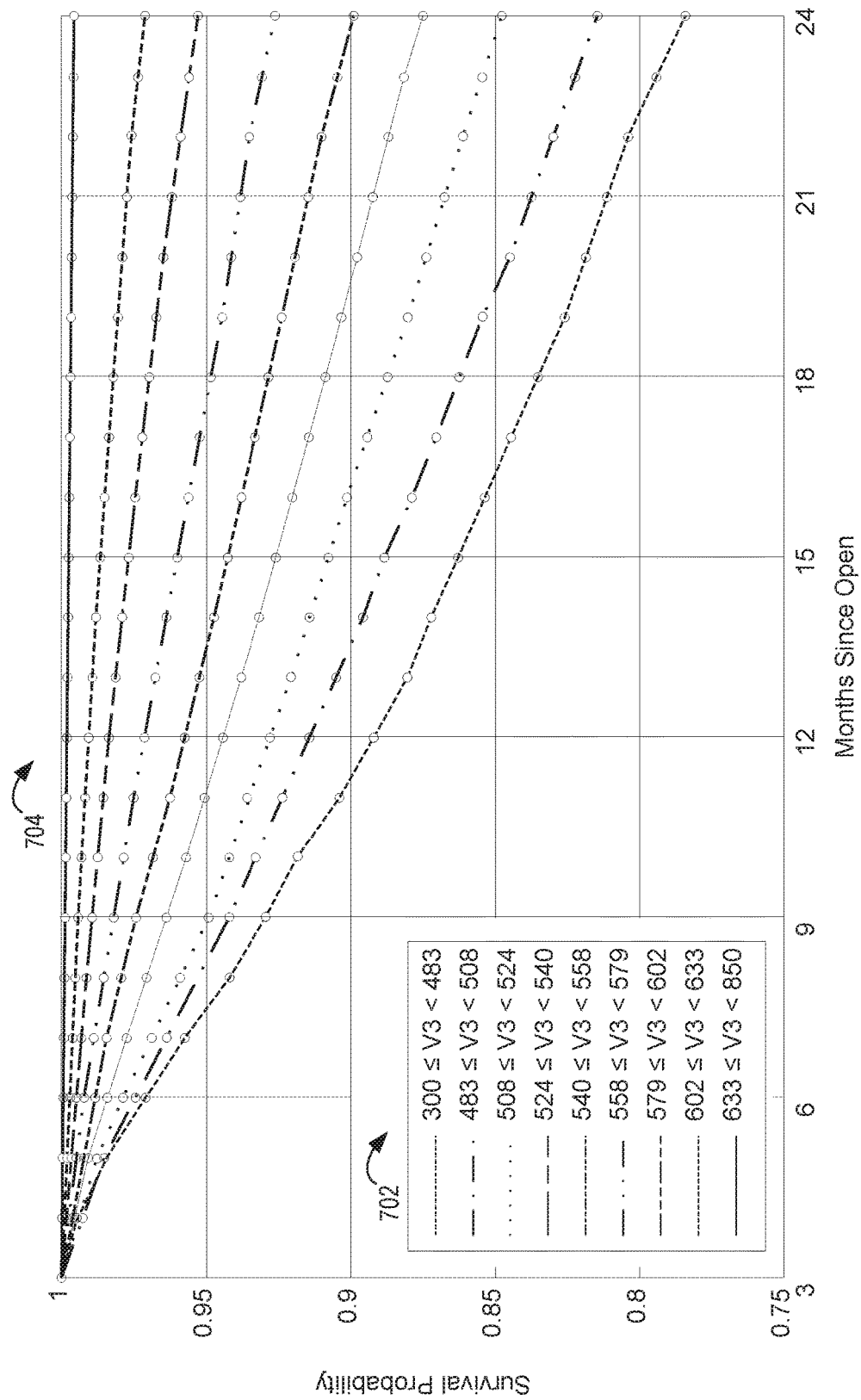
FIG. 7 depicts an example of generating distinct survival functions for different classes of entities, according to certain aspects of the present disclosure.

In some aspects, regression trees can be applied to exploratory data analysis and predictor variable binning for survival models. FIG. 6 is a graph for an illustrative example in which the target event is a default. FIG. 6 demonstrates the relationship between the model target variable, time to default, and a possible predictor variable, such as a risk assessment score (e.g., the Vantage 3.0 score), that is useful for the EDA step in a model building process. The results estimated from a survival function S(t) are depicted using a dashed line 604. The regression tree fit is depicted using the solid line 602. In this example, the depicted results show that a tree-based model can be used to effectively bin the predictor variables for credit risk timing models. FIG. 7 illustrates an example of Kaplan-Meier estimates of the survival function using ranges of a risk assessment score (e.g., a Vantage 3.0 score) that are constructed from a regression tree model. In this example, different ranges 702 of the risk assessment score result in distinct survival functions 704 for different classes of entities (e.g., entities with different levels of credit risk).

Example of Explanatory Data Generated from Timing-Prediction Models

Explanatory data can be generated from a timing-prediction model using any appropriate method described herein.

An example of explanatory data is a reason code, adverse action code, or other data indicating an impact of a given independent variable on a predictive output. For instance, explanatory reason codes may indicate why an entity received a particular predicted output. The explanatory reason codes can be generated from the adjusted timing-prediction model to satisfy suitable requirements. Examples of these rules include explanatory requirements, business rules, regulatory requirements, etc.

In some aspects, a reason code or other explanatory data may be generated using a "points below max" approach or a "points for max improvement" approach. The independent variable values that maximize $F(x; \beta)$ used for generating reason codes (or other explanatory data) can be determined using the monotonicity constraints that were enforced in model development. For example, let $x^*_i (i=1, \ldots, n)$ be the right endpoint of the domain of the independent variable $x_i$. Then, for a monotonically increasing function, the output function is maximized at $F(x^*; \beta)$, where $\beta$ is the set of all parameters associated with the model and all other variables previously defined. A "points below max" approach determines the difference between, for example, an idealized output and a particular entity (e.g. subject, person, or object) by finding values of one or more independent variables that maximize $F(x; \beta)$.

Reason codes for the independent variables may be generated by rank ordering the differences obtained from either of the following functions:

$$F(x^*_1, x^*_2, \ldots, x^*_j, \ldots, x^*_n; \beta) - F(x^*_1, x^*_2, \ldots, x^*_j, \ldots, x^*_n; \beta)$$

$$F(x^*_1, \ldots, x^*_j, \ldots, x^*_n; \beta) - F(x^*_1, \ldots, x^*_j, \ldots, x^*_n; \beta)$$

In these examples, the first function is used for a "points below max" approach and the second function is used for a "points for max improvement" approach. For a monotonically decreasing function, the left endpoint of the domain of the independent variables can be substituted into $x^*_j$.

In the example of a "points below max" approach, a decrease in the output function for a given entity is computed using a difference between the maximum value of the output function using $x^*$ and the decrease in the value of the output function given x. In the example of a "points for max improvement" approach, a decrease in the output function is computed using a difference between two values of the output function. In this case, the first value is computed using the output-maximizing value for $x^*_j$ and a particular entity's values for the other independent variables. The decreased value of the output function is computed using the particular entity's value for all of the independent variables $x_i$.

As a specific example, in the case of logistic regression, the "points for max improvement" equation leads to $\beta(x^*_i - x_i)$, which is computed for all n attributes in the model. In this example, adverse action is solely dependent on how much an individual's attribute value ($x_i$) varies from its maximum value ($x^*_i$) and whether the attribute influences the final score in an increasing or decreasing manner. This example shows that attributes $x_i$ in certain risk-modeling schemes should have a monotonic relationship with the dependent variable y, and the bivariate relationship between each $x_i$ and y observed in the raw data be preserved in the model.

Examples of Host System Operations Using a Set of Timing-Prediction Models

A host computing system 102 can execute the timing-prediction model code 130 to perform one or more operations. In an illustrative example of a process executed by a host computing system 102, the host computing system 102 can receive or otherwise access predictor variable data. For instance, a host computing system 102 can be communicatively coupled to one or more non-transitory computer-readable media, either locally or via a data network. The host computing system 102 can request, retrieve, or otherwise access predictor variable data that includes data values of one or more predictor variables 124 with respect to a target, such as a target individual or other entity.

Continuing with this example, the host computing system 102 can compute a set of probabilities for the target event by executing the predictive response application 104, which can include program code outputted by a development computing system 114. Executing the program code can cause one or more processing devices of the host computing system 102 to apply the set of timing-prediction models, which have been trained with the development computing system 114, to the predictor variable data. The host computing system 102 can also compute, from the set of probabilities, a time of a target event (e.g., an adverse action or other event of interest).

The host computing system 102 can modify a host system operation based on the computed time of the target event. For instance, the time of a target event can be used to modify the operation of different types of machine-implemented systems within a given operating environment.

In some aspects, a target event include or otherwise indicates a risk of failure of a hardware component within a set of machinery or a malfunction associated with the hardware component A host computing system 102 can compute an estimated time until the failure or malfunction occurs. The host computing system 102 can output a recommendation to a consumer computing system 106, such as a laptop or mobile device used to monitor a manufacturing or medical system, a diagnostic computing device included in an industrial setting, etc. The recommendation can include the estimated time until the malfunction or failure of the hardware component, a recommendation to replace the hardware component, or some combination thereof. The operating environment can be modified by performing maintenance, repairs, or replacement with respect to the affected hardware component.

In additional or alternative aspects, a target event indicates a risk level associated with a target entity that is described by or otherwise associated with the predictor variable data. Modifying the host system operation based on the computed time of the target can include causing the host computing system 102 or another computing system to control access to one or more interactive computing environments by a target entity associated with the predictor variable data.

For example, the host computing system 102, or another computing system that is communicatively coupled to the host computing system 102, can include one or more processing devices that execute instructions providing an interactive computing environment accessible to consumer computing systems 106. Examples of the interactive computing environment include a mobile application specific to a particular host computing system 102, a web-based application accessible via mobile device, etc. In some aspects, the executable instructions for the interactive computing environment can include instructions that provide one or more graphical interfaces. The graphical interfaces are used by a consumer computing system 106 to access various functions of the interactive computing environment. For instance, the interactive computing environment may transmit data to and receive data from a consumer computing system 106 to shift between different states of interactive computing environment, where the different states allow one or more electronics transactions between the consumer computing system 106 and the host computing system 102 (or other computing system) to be performed. If a risk level is sufficiently low (e.g., is less than a user-specified threshold), the host computing system 102 (or other computing system) can provide a consumer computing system 106 associated with the target entity with access to a permitted function of the interactive computing environment. If a risk level is too high (e.g., exceeds a user-specified threshold), the host computing system 102 (or other computing system) can prevent a consumer computing system 106 associated with the target entity from accessing a restricted function of the interactive computing environment.

The following discussion involves, for illustrative purposes, a simplified example of an interactive computing environment implemented through a host computing system 102 to provide access to various online functions. In this example, a user of a consumer computing system 106 can engage in an electronic transaction with a host computing system 102 via an interactive computing environment. An electronic transaction between the consumer computing system 106 and the host computing system 102 can include, for example, the consumer computing system 106 being used to query a set of sensitive or other controlled data, access online financial services provided via the interactive computing environment, submit an online credit card application or other digital application to the host computing system 102 via the interactive computing environment, operating an electronic tool within an interactive computing environment provided by a host computing system 102 (e.g., a content-modification feature, an application-processing feature, etc.), or perform some other electronic operation within a computing environment.

For instance, a website or other interactive computing environment provided by a financial institution's host computing system 102 can include electronic functions for obtaining one or more financial services, such as loan application and management tools, credit card application and transaction management workflows, electronic fund transfers, etc. A consumer computing system 106 can be used to request access to the interactive computing environment provided by the host computing system 102, which can selectively grant or deny access to various electronic functions.

Based on the request, the host computing system 102 can collect data associated with the customer and execute a predictive response application 104, which can include a set of timing-prediction model code 130 that is generated with the development computing system 114. Executing the predictive response application 104 can cause the host computing system 102 to compute a risk indicator (e.g., a risk assessment score, a predicted time of occurrence for the target event, etc.). The host computing system 102 can use the risk indicator to instruct another device, such as a web server within the same computing environment as the host computing system 102 or an independent, third-party computing system in communication with the host computing system 102. The instructions can indicate whether to grant the access request of the consumer computing system 106 to certain features of the interactive computing environment.

For instance, if timing data (or a risk indicator derived from the timing data) indicates that a target entity is associated with a sufficient likelihood of a particular risk, a consumer computing system 106 used by the target entity can be prevented from accessing certain features of an interactive computing environment. The system controlling the interactive computing environment (e.g., a host computing system 102, a web server, or some combination thereof) can prevent, based on the threshold level of risk, the consumer computing system 106 from advancing a transaction within the interactive computing environment. Preventing the consumer computing system 106 from advancing the transaction can include, for example, sending a control signal to a web server hosting an online platform, where the control signal instructs the web server to deny access to one or more functions of the interactive computing environment (e.g., functions available to authorized users of the platform).

Additionally or alternatively, modifying the host system operation based on the computed time of the target can include causing a system that controls an interactive computing environment (e.g., a host computing system 102, a web server, or some combination thereof) to modify the functionality of an online interface provided to a consumer computing system 106 associated with the target entity. For instance, the host computing system 102 can use timing data (e.g., an adverse action timing prediction) generated by the timing-prediction model code 130 to implement a modification to an interface of an interactive computing environment presented at a consumer computing system 106. In this example, the consumer computing system 106 is associated with a particular entity whose predictor variable data is used to compute the timing data. If the timing data indicates that a target event for a target entity will occur in a given time period, the host computing system 102 (or a third-party system with which the host computing system 102 communicates) could rearrange the layout of an online interface so that features or content associated with a particular risk level are presented more prominently (e.g., by presenting online products or services targeted to the risk level), features or content associated with different risk levels are hidden, presented less prominently, or some combination thereof.

In various aspects, the host computing system 102 or a third-party system performs these modifications automatically based on an analysis of the timing data (alone or in combination with other data about the entity), manually based on user inputs that occur subsequent to computing the timing data with the timing-prediction model code 130, or some combination thereof. In some aspects, modifying one or more interface elements is performed in real time, i.e., during a session in which a consumer computing system 106 accesses or attempts to access an interactive computing environment. For instance, an online platform may include different modes, in which a first type of interactive user experience (e.g., placement of menu functions, hiding or displaying content, etc.) is presented to a first type of user group associated with a first risk level and a second type of interactive user experience is presented to a second type of user group associated with a different risk level. If, during a session, timing data is computed that indicates that a user of the consumer computing system 106 belongs to the second group, the online platform could switch to the second mode.

In some aspects, modifying the online interface or other features of an interactive computing environment can be used to control communications between a consumer computing system 106 and a system hosting an online environment (e.g., a host computing system 102 that executes a predictive response applications 104, a third-party computing system in communication with the host computing system 102, etc.). For instance, timing data generated using a set of timing-prediction models could indicate that a consumer computing system 106 or a user thereof is associated with a certain risk level. The system hosting an online environment can require, based on the determined risk level, that certain types of interactions with an online interface be performed by the consumer computing system 106 as a condition for the consumer computing system 106 to be provided with access to certain features of an interactive computing environment. In one example, the online interface can be modified to prompt for certain types of authentication data (e.g., a password, a biometric, etc.) to be inputted at the consumer computing system 106 before allowing the consumer computing system 106 to access certain tools within the interactive computing environment. In another example, the online interface can be modified to prompt for certain types of transaction data (e.g., payment information and a specific payment amount authorized by a user, acceptance of certain conditions displayed via the interface) to be inputted at the consumer computing system 106 before allowing the consumer computing system 106 to access certain portions of the interactive computing environment, such as tools available to paying customers. In another example, the online interface can be modified to prompt for certain types of authentication data (e.g., a password, a biometric, etc.) to be inputted at the consumer computing system 106 before allowing the consumer computing system 106 to access certain secured datasets via the interactive computing environment.

In additional or alternative aspects, a host computing system 102 can use timing data generated by the timing-prediction model code 130 to generate one or more reports regarding an entity or a group of entities. In a simplified example, knowing when an entity, such as a borrower, is likely to experience a particular adverse action, such as a default, could allow a user of the host computing system 102 (e.g., a lender) to more accurately price certain online products, to predict time between defaults for a given customer and thereby manage customer portfolios, optimize and value portfolios of loans by providing timing information, etc.

Example of Using a Neural Network for Timing-Prediction Model

In some aspects, a timing-prediction model built for a given time bin (or other time period) can be a neural network model. A neural network can be represented as one or more hidden layers of interconnected nodes that can exchange data between one another. The layers may be considered hidden because they may not be directly observable in the normal functioning of the neural network.

A neural network can be trained in any suitable manner. For instance, the connections between the nodes can have numeric weights that can be tuned based on experience. Such tuning can make neural networks adaptive and capable of "learning." Tuning the numeric weights can involve adjusting or modifying the numeric weights to increase the accuracy of a risk indicator, prediction of entity behavior, or other response variable provided by the neural network. Additionally or alternatively, a neural network model can be trained by iteratively adjusting the predictor variables represented by the neural network, the number of nodes in the neural network, or the number of hidden layers in the neural network. Adjusting the predictor variables can include eliminating the predictor variable from the neural network. Adjusting the number of nodes in the neural network can include adding or removing a node from a hidden layer in the neural network. Adjusting the number of hidden layers in the neural network can include adding or removing a hidden layer in the neural network.

In some aspects, training a neural network model for each time bin includes iteratively adjusting the structure of the neural network (e.g., the number of nodes in the neural network, number of layers in the neural network, connections between layers, etc.) such that a monotonic relationship exists between each of the predictor variables and the risk indicator, prediction of entity behavior, or other response variable. Examples of a monotonic relationship between a predictor variable and a response variable include a relationship in which a value of the response variable increases as the value of the predictor variable increases or a relationship in which the value of the response variable decreases as the value of the predictor variable increases. The neural network can be optimized such that a monotonic relationship exists between each predictor variable and the response variable. The monotonicity of these relationships can be determined based on a rate of change of the value of the response variable with respect to each predictor variable.

In some aspects, the monotonicity constraint is enforced using an exploratory data analysis of the training data. For example, if the exploratory data analysis indicates that the relationship between one of the predictor variables and an odds ratio (e.g., an odds index) is positive, and the neural network shows a negative relationship between a predictor variable and a credit score, the neural network can be modified. For example, the predictor variable can be eliminated from the neural network or the architecture of the neural network can be changed (e.g., by adding or removing a node from a hidden layer or increasing or decreasing the number of hidden layers).

Example of Using a Logistic Regression for Timing-Prediction Model

In additional or alternative aspects, a timing-prediction model built for a particular time bin (or other time period) can be a logistic regression model. A logistic regression model can be generated by determining an appropriate set of logistic regression coefficients that are applied to predictor variables in the model. For example, input attributes in a set of training data are used as the predictor variables. The logistic regression coefficients are used to transform or otherwise map these input attributes into particular outputs in the training data (e.g., predictor data samples 122 and response data samples 126).

Example of Using a Tree-Based Timing-Prediction Model

In additional or alternative aspects, a timing-prediction model built for a particular time bin (or other time period) can be a tree-based machine-learning model. For example, the model-development engine 116 can retrieve the objective function from a non-transitory computer-readable medium. The objective function can be stored in the non-transitory computer-readable medium based on, for example, one or more user inputs that define, specify, or otherwise identify the objective function. In some aspects, the model-development engine 116 can retrieve the objective function based on one or more user inputs that identify a particular objective function from a set of objective functions (e.g., by selecting the particular objective function from a menu).

The model-development engine 116 can partition, for each predictor variable in the set X, a corresponding set of the predictor data samples 122 (i.e., predictor variable values). The model-development engine 116 can determine the various partitions that maximize the objective function. The model-development engine 116 can select a partition that results in an overall maximized value of the objective function as compared to each other partition in the set of partitions. The model-development engine 116 can perform a split that results in two child node regions, such as a left-hand region $R_L$ and a right-hand region $R_R$. The model-development engine 116 can determine if a tree-completion criterion has been encountered. Examples of tree-completion criterion include, but are not limited to: the tree is built to a pre-specified number of terminal nodes, or a relative change in the objective function has been achieved. The model-development engine 116 can access one or more tree-completion criteria stored on a non-transitory computer-readable medium and determine whether a current state of the decision tree satisfies the accessed tree-completion criteria. If so, the model-development engine 116 can output the decision tree. Outputting the decision tree can include, for example, storing the decision tree in a non-transitory computer-readable medium, providing the decision tree to one or more other processes, presenting a graphical representation of the decision tree on a display device, or some combination thereof.

Regression and classification trees partition the predictor variable space into disjoint regions, $R_k$ (k=1, ..., K). Each region is assigned a representative response value $\beta_k$. A decision tree T can be specified as:

$$T(x; \Theta) = \sum_{k=1}^{K} \beta_k I(x \in R_k), \quad (15)$$

where $\Theta = \{R_k, \beta_k\}_1^K$, $I(.)=1$ if the argument is true and 0 otherwise, and all other variables previously defined. The parameters of Equation (15) are found by maximizing a specified objective function L:

$$\hat{\Theta} = \mathrm{argmax}_\Theta \sum_{i=1}^{n} L(y_i, T(x_i; \Theta)). \quad (16)$$

The estimates, $\hat{R}_k$, of $\hat{\Theta}$ can be computed using a greedy (i.e. choosing the split that maximizes the objective function), top-down recursive partitioning algorithm, after which estimation of $\beta_k$ is superficial (e.g., $\hat{\beta}_k = f(y_i \in \hat{R}_k)$).

A random forest model is generated by building independent trees using bootstrap sampling and a random selection of predictor variables as candidates for splitting each node. The bootstrap sampling involves sampling certain training data (e.g., predictor data samples 122 and response data samples 126) with replacement, so that the pool of available data samples is the same between different sampling operations. Random forest models are an ensemble of independently built tree-based models. Random forest models can be represented as:

$$F_M(x; \Omega) = q \sum_{m=1}^{M} T_m(x; \Theta_m), \quad (17)$$

where M is the number of independent trees to build, $\Omega = \{\Theta_m\}_1^M$, and q is an aggregation operator or scalar (e.g., $q=M^{-1}$ for regression), with all other variables previously defined.

To create a random forest model, the model-development engine 116 can select or otherwise identify a number M of independent trees to be included in the random forest model. For example, the number M can be stored in a non-transitory computer-readable medium accessible to the model-development engine 116, can be received by the model-development engine 116 as a user input, or some combination thereof. The model-development engine 116 can select, for each tree from 1 ... M, a respective subset of data samples to be used for building the tree. For example, for a given set of the trees, the model-development engine 116 can execute one or more specified sampling procedures to select the subset of data samples. The selected subset of data samples is a bootstrap sample for that tree.

The model-development engine 116 can execute a tree-building algorithm to generate the tree based on the respective subset of data samples for that tree. For instance, the model-development engine 116 can select, for each split in the tree building process, k out of p predictor variables for use in the splitting process using the specified objective function. The model-development engine 116 can combine the generated decision trees into a random forest model. For example, the model-development engine 116 can generate a random forest model $F_M$ by summing the generated decision trees according to the function $$F_M(x; \hat{\Omega}) = q \sum_{m=1}^{M} T_m(x; \hat{\Theta}_m).$$

The model-development engine 116 can output the random forest model. Outputting the random forest model can include, for example, storing the random forest model in a non-transitory computer-readable medium, providing the random forest model to one or more other processes, presenting a graphical representation of the random forest model on a display device, or some combination thereof.

Gradient boosted machine models can also utilize tree-based models. The gradient boosted machine model can be generalized to members of the underlying exponential family of distributions. For example, these models can use a vector of responses, $y=\{y_i\}_1^n$, satisfying $$y = \mu + e, \quad (18)$$

and a differentiable monotonic link function F(.) such that $$F_M(\mu) = \sum_{m=1}^{M} T_m(x; \Theta_m), \quad (19)$$

where, m=1, ..., M and $\Theta = \{R_k, \beta_k\}_1^K$. Equation (19) can be rewritten in a form more reminiscent of the generalized linear model as $$F_M(\mu) = \sum_{m=1}^{M} X_m \beta_m \quad (20)$$

where, $X_m$ is a design matrix of rank k such that the elements of the $i^{th}$ column of $X_m$ include evaluations of $I(x \in R_k)$ and $\beta_m = \{\beta\}_1^k$. Here, $X_m$ and $\beta_m$ represent the design matrix (basis functions) and corresponding representative response values of the $m^{th}$ tree. Also, e is a vector of unobserved errors with $E(e|\mu)=0$ and $$\mathrm{cov}(e|\mu) = R_\mu. \quad (21)$$

Here, $R_\mu$ is a diagonal matrix containing evaluations at $\mu$ of a known variance function for the distribution under consideration.

Estimation of the parameters in Equation (19) involves maximization of the objective function $$\hat{\Theta} = \mathrm{argmax}_\Theta \sum_{i=1}^{n} L\left(y_i, \sum_{m=1}^{M} T_m(x_i; \Theta_m)\right). \quad (22)$$

In some cases, maximization of Equation (22) is computationally expensive. An alternative to direct maximization of Equation (22) is a greedy stage-wise approach, represented by the following function:

$$\hat{\Theta}_m = \text{argmax}_\Theta \sum_{i=1}^n L(y_i, T_m(x_i; \Theta_m) + v). \quad (23)$$

Thus, $$F_m(\mu) = T_m(x; \Theta_m) + v \quad (24)$$

where, $$v = \sum_{j=1}^{m-1} F_j(\mu) = \sum_{j=1}^{m-1} T_j(x; \Theta_j).$$

Methods of estimation for the generalized gradient boosting model at the $m^{th}$ iteration are analogous to estimation in the generalized linear model. Let $\hat{\Theta}_m$ be known estimates of $\Theta_m$ and $\hat{\mu}$ is defined as $$\hat{\mu} = F_m^{-1}[T_m(x; \hat{\Theta}_m) + v]. \quad (25)$$

Letting $$z = F_m(\hat{\mu}) + F'_m(\mu)(y - \hat{\mu}) - v \quad (26)$$

then, the following equivalent representation can be used:

$$z | \Theta_m \sim N[T_m(x; \Theta_m), F'_m(\hat{\mu}) R_{\hat{\mu}} F'_m(\hat{\mu})]. \quad (27)$$

Letting $\Theta_m$ be an unknown parameter, this takes the form of a weighted least squares regression with diagonal weight matrix $$\hat{W} = R_{\hat{\mu}}^{-1}[F'(\hat{\mu})]^{-2}. \quad (28)$$

Table 1 includes examples of various canonical link functions $\hat{W} = R_{\hat{\mu}}$.

TABLE 1

| Distribution | F(μ) | Weight |
|---|---|---|
| Binomial | log[μ/(1 − μ)] | μ(1 − μ) |
| Poisson | log(μ) | μ |
| Gamma | $\mu^{-1}$ | $\mu^{-2}$ |
| Gaussian | μ | 1 |

The response z is a Taylor series approximation to the linked response F(y) and is analogous to the modified dependent variable used in iteratively reweighted least squares. The objective function to maximize corresponding to the model for z is $$L(\Theta_m, R; z) = \quad (29)$$
$$-\frac{1}{2}\log|\phi V| - \frac{1}{2\phi}(z - T_m(x; \Theta_m))^T V^{-1}(z - T_m(x; \Theta_m)) - \frac{n}{2}\log(2\pi),$$

where, $V = W^{-1/2} R_\mu W^{-1/2}$ and $\phi$ is an additional scale/dispersion parameter. Estimation of the components in Equation (19) are found in a greedy forward stage-wise fashion, fixing the earlier components.

To create a gradient boosted machine model, the model-development engine 116 can identify a number of trees for a gradient boosted machine model and specify a distributional assumption and a suitable monotonic link function for the gradient boosted machine model.

The model-development engine 116 can select or otherwise identify a number M of independent trees to be included in the gradient boosted machine model and a differentiable monotonic link function F(.) for the model. For example, the number M and the function F(.) can be stored in a non-transitory computer-readable medium accessible to the model-development engine 116, can be received by the model-development engine 116 as a user input, or some combination thereof.

The model-development engine 116 can compute an estimate of μ, $\hat{\mu}$ from the training data or an adjustment that permits the application of an appropriate link function (e.g.

$$\hat{\mu} = n^{-1}\sum_{i=1}^n y_i),$$

and set $v_0 = F_0(\hat{\mu})$, and define $R_{\hat{\mu}}$. The model-development engine 116 can generate each decision tree using an objective function such as a Gaussian log likelihood function (e.g., Equation 15). The model-development engine 116 can regress z to x with a weight matrix $\hat{W}$. This regression can involve estimating the $\Theta_m$ that maximizes the objective function in a greedy manner. The model-development engine 116 can update $v_m = v_{m-1} + T_m(x; \hat{\Theta}_m)$ and setting $\hat{\mu} = F_m^{-1}(v_m)$. The model-development engine 116 can execute this operation for each tree. The model-development engine 116 can output a gradient boosted machine model. Outputting the gradient boosted machine model can include, for example, storing the gradient boosted machine model in a non-transitory computer-readable medium, providing the gradient boosted machine model to one or more other processes, presenting a graphical representation of the gradient boosted machine model on a display device, or some combination thereof.

In some aspects, the tree-based machine-learning model for each time bin is iteratively adjusted to enforce monotonicity with respect to output values associated with the terminal nodes of the decision trees in the model. For instance, the model-development engine 116 can determine whether values in the terminal nodes of a decision tree have a monotonic relationship with respect to one or more predictor variables in the decision tree. In one example of a monotonic relationship, the predicted response increases as the value of a predictor variable increases (or vice versa). If the model-development engine 116 detects an absence of a required monotonic relationship, the model-development engine 116 can modify a splitting rule used to generate the decision tree. For example, a splitting rule may require that data samples with predictor variable values below a certain threshold value are placed into a first partition (i.e., a left-hand side of a split) and that data samples with predictor variable values above the threshold value are placed into a second partition (i.e., a right-hand side of a split). This splitting rule can be modified by changing the threshold value used for partitioning the data samples.

A model-development engine 116 can also train an unconstrained tree-based machine-learning model by smoothing over the representative response values. For example, the model-development engine 116 can determine whether values in the terminal nodes of a decision tree are monotonic. If the model-development engine 116 detects an absence of a required monotonic relationship, the model-development engine 116 can smooth over the representative response values of the decision tree, thus enforcing monotonicity. For example, a decision tree may require that the predicted response increases if the decision tree is read from left to right. If this restriction is violated, the predicted responses can be smoothed (i.e., altered) to enforce monotonicity.

Computing System Example

Figure 8:
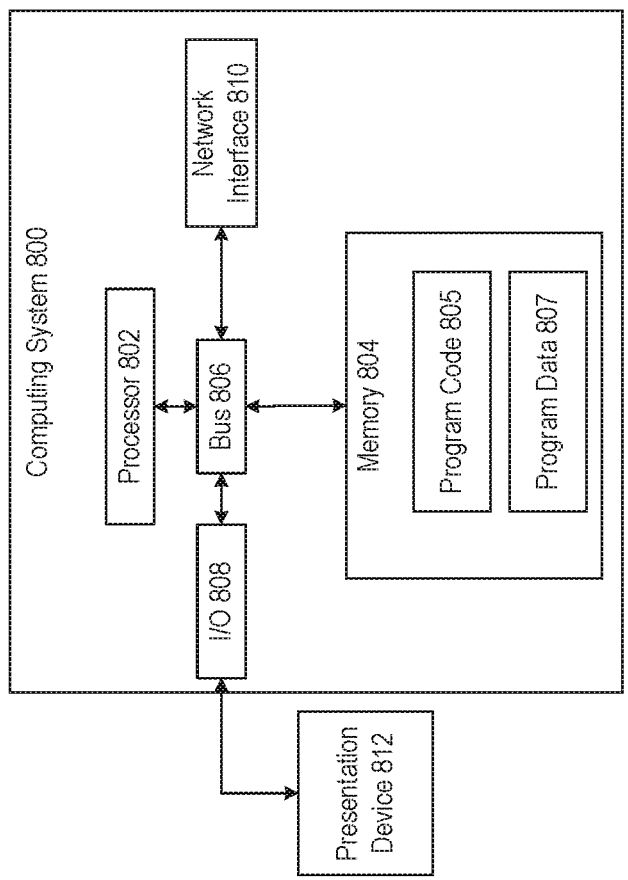
FIG. 8 depicts an example of a computing system suitable for implementing aspects of the techniques and technologies presented herein.

Any suitable computing system or group of computing systems can be used to perform the operations described herein. For example, FIG. 8 is a block diagram depicting an example of a computing system 800 that can be used to implement one or more of the systems depicted in FIG. 1 (e.g., a host computing system 102, a development computing system 114, etc.). The example of the computing system 800 can include various devices for communicating with other devices in the computing system 100, as described with respect to FIG. 1. The computing system 800 can include various devices for performing one or more of the operations described above.

The computing system 800 can include a processor 802, which includes one or more devices or hardware components communicatively coupled to a memory 804. The processor 802 executes computer-executable program code 805 stored in the memory 804, accesses program data 807 stored in the memory 804, or both. Examples of a processor 802 include a microprocessor, an application-specific integrated circuit, a field-programmable gate array, or any other suitable processing device. The processor 802 can include any number of processing devices, including one. The processor 802 can include or communicate with a memory 804. The memory 804 stores program code that, when executed by the processor 802, causes the processor to perform the operations described in this disclosure.

The memory 804 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing system 800 can execute program code 805. The program code 805 may be stored in any suitable computer-readable medium and may be executed on any suitable processing device. For example, as depicted in FIG. 8, the program code for the model-development engine 116 can reside in the memory 804 at the computing system 800. Executing the program code 805 can configure the processor 802 to perform one or more of the operations described herein.

Program code 805 stored in a memory 804 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Examples of the program code 805 include one or more of the applications, engines, or sets of program code described herein, such as a model-development engine 116, an interactive computing environment presented to a consumer computing system 106, timing-prediction model code 130, a predictive response application 104, etc.

Examples of program data 807 stored in a memory 804 may include one or more databases, one or more other data structures, datasets, etc. For instance, if a memory 804 is a network-attached storage device 118, program data 807 can include predictor data samples 122, response data samples 124, etc. If a memory 804 is a storage device used by a host computing system 102 or a host computing system 102, program data 807 can include predictor variable data, data obtained via interactions with consumer computing systems 106, etc.

The computing system 800 may also include a number of external or internal devices such as input or output devices. For example, the computing system 800 is shown with an input/output interface 808 that can receive input from input devices or provide output to output devices. A bus 806 can also be included in the computing system 800. The bus 806 can communicatively couple one or more components of the computing system 800.

In some aspects, the computing system 800 can include one or more output devices. One example of an output device is the network interface device 810 depicted in FIG. 8. A network interface device 810 can include any device or group of devices suitable for establishing a wired or wireless data connection to one or more data networks (e.g., a public data network 108, a private data network 112, etc.). Non-limiting examples of the network interface device 810 include an Ethernet network adapter, a modem, etc. Another example of an output device is the presentation device 812 depicted in FIG. 8. A presentation device 812 can include any device or group of devices suitable for providing visual, auditory, or other suitable sensory output. Non-limiting examples of the presentation device 812 include a touch-screen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter is described with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such variations or additions as would be readily apparent to one of ordinary skill in the art.

The invention claimed is:

1. A computing system comprising:
in a secured part of the computing system:
a data repository storing predictor data samples and response data samples, wherein (i) the predictor data samples include values of predictor variables that respectively correspond to actions performed by an entity or observations of the entity and (ii) each response data sample includes a respective outcome value of a response variable having a set of outcome values associated with the entity,
an external-facing subsystem configured for preventing a host server system from accessing the data repository via a data network, and
a development server system configured for:
accessing training data comprising a subset of the predictor data samples for a training window and a subset of the response data samples for the training window,
building a set of timing-prediction models from the training data, wherein building each timing-prediction model comprises training the timing-prediction model to predict a target event for a respective time bin within the training window, wherein the training window comprises two or more time bins and wherein at least two of the two or more time bins overlap,
generating program code configured to (i) compute a set of probabilities for the target event by applying the set of timing-prediction models to predictor variable data and (ii) compute a time of the target event from the set of probabilities, and
outputting the program code to the host server system via the external-facing subsystem; and
the host server system, wherein the host server system is communicatively coupled to the development server system and comprises one or more processing devices configured for executing the program code and thereby performing operations comprising:
receiving the predictor variable data,
computing a set of probabilities for the target event by applying the set of timing-prediction models to the predictor variable data,
computing a time of the target event from the set of probabilities, and
modifying a host system operation based on the computed time of the target event.

2. The computing system of claim 1, wherein building the set of timing-prediction models comprises:
partitioning the training window into time bins, wherein the time bins include a first time bin for a first time period and a second time bin for a second time period, wherein the first time period and the second time period include an overlapping time period;
training a first timing-prediction model from the set of timing-prediction models to predict training target events from a first training data subset that includes predictor data samples limited to the first time bin and response data samples limited to the first time bin; and
training a second timing-prediction model from the set of timing-prediction models to predict training target events from a second training data subset that includes predictor data samples limited to the second time bin and response data samples limited to the second time bin.

3. The computing system of claim 2, wherein the development server system is further configured to iteratively adjust each timing-prediction model to enforce a monotonic relationship between each predictor variable and the response variable.

4. The computing system of claim 1, wherein the development server system is further configured to iteratively adjust each timing-prediction model to enforce a monotonic relationship between each predictor variable and the response variable, wherein the program code generated by the development server system is further configured to compute, based on each timing-prediction model having the monotonic relationship, a set of explanatory codes including data describing contributions of the predictor variables to a probability for the target event.

5. The computing system of claim 1, wherein modifying the host system operation based on the computed time of the target event comprises one or more of:
causing the host server system or another computing system to control access to one or more interactive computing environments by a target entity associated with the predictor variable data, wherein the target event indicates a risk level associated with the target entity;
causing the host server system or a web server to modify a functionality of an online interface provided to a third-party computing device associated with the target entity, wherein the target event indicates the risk level associated with the target entity; and
causing the host server system to output a recommendation to replace a hardware component in a set of machinery, wherein the target event indicates a risk of failure of the hardware component or malfunction associated with the hardware component.

6. The computing system of claim 1, wherein the target event indicates a risk level associated with a target entity described by the predictor variable data, wherein modifying the host system operation based on the computed time of the target event comprises one or more of:

providing a computing device associated with the target entity with access to a permitted function of an interactive computing environment based on the risk level; and preventing the computing device associated with the target entity from accessing a restricted function of the interactive computing environment based on the risk level.

7. The computing system of claim 1, wherein the target event indicates a risk level associated with a target entity described by the predictor variable data, wherein modifying the host system operation based on the computed time of the target event comprises causing the host server system or a web server to modify a functionality of an online interface provided to a third-party computing device associated with the target entity.

8. A method in which one or more processing devices performs operations comprising:
    accessing training data comprising predictor data samples for a training window and response data samples for the training window, wherein (i) the predictor data samples include values of predictor variables that respectively correspond to actions performed by an entity or observations of the entity and (ii) each response data sample includes a respective outcome value of a response variable having a set of outcome values associated with the entity;
    building a set of timing-prediction models from the training data, wherein building each timing-prediction model comprises training the timing-prediction model to predict a target event for a respective time bin within the training window, wherein the training window comprises two or more time bins and wherein at least two of the two or more time bins overlap;
    generating program code configured to (i) compute a set of probabilities for the target event by applying the set of timing-prediction models to predictor variable data and (ii) compute a time of the target event from the set of probabilities; and
    outputting the program code to a host computing system that is configured for modifying a host system operation based on executing the program code to compute a time of the target event.

9. The method of claim 8, further comprising the host computing system executing the program code and thereby performing additional operations comprising:
    receiving the predictor variable data;
    computing a set of probabilities for the target event by applying the set of timing-prediction models to the predictor variable data;
    computing the time of the target event from the set of probabilities; and
    modifying the host system operation based on the computed time of the target event.

10. The method of claim 8, wherein building the set of timing-prediction models comprises:
    partitioning the training window into time bins, wherein the time bins include a first time bin for a first time period and a second time bin for a second time period, wherein the first time period and the second time period include an overlapping time period;
    training a first timing-prediction model from the set of timing-prediction models to predict training target events from a first training data subset that includes predictor data samples limited to the first time bin and response data samples limited to the first time bin; and
    training a second timing-prediction model from the set of timing-prediction models to predict training target events from a second training data subset that includes predictor data samples limited to the second time bin and response data samples limited to the second time bin.

11. The method of claim 10, further comprising iteratively adjusting each timing-prediction model to enforce a monotonic relationship between each predictor variable and the response variable.

12. The method of claim 8, further comprising iteratively adjusting each timing-prediction model to enforce a monotonic relationship between each predictor variable and the response variable, wherein the program code is further configured to compute, based on each timing-prediction model having the monotonic relationship, a set of explanatory codes including data describing contributions of the predictor variables to a probability for the target event.

13. The method of claim 8, wherein modifying the host system operation based on the computed time of the target event comprises one or more of:
    causing the host computing system or another computing system to control access to one or more interactive computing environments by a target entity associated with the predictor variable data, wherein the target event indicates a risk level associated with the target entity;
    causing the host computing system or a web server to modify a functionality of an online interface provided to a third-party computing device associated with the target entity, wherein the target event indicates the risk level associated with the target entity; and
    causing the host computing system to output a recommendation to replace a hardware component in a set of machinery, wherein the target event indicates a risk of failure of the hardware component or malfunction associated with the hardware component.

14. The method of claim 8, wherein the target event indicates a risk level associated with a target entity described by the predictor variable data, wherein modifying the host system operation based on the computed time of the target event comprises one or more of:
    providing a computing device associated with the target entity with access to a permitted function of an interactive computing environment based on the risk level; and
    preventing the computing device associated with the target entity from accessing a restricted function of the interactive computing environment based on the risk level.

15. The method of claim 8, wherein the target event indicates a risk level associated with a target entity described by the predictor variable data, wherein modifying the host system operation based on the computed time of the target event comprises causing the host computing system or a web server to modify a functionality of an online interface provided to a third-party computing device associated with the target entity.

16. A non-transitory computer-readable medium storing program code executable by one or more processing devices, wherein the program code, when executed by the one or more processing devices, configures the one or more processing devices to perform operations comprising:
    accessing training data comprising predictor data samples for a training window and response data samples for the training window, wherein (i) the predictor data samples include values of predictor variables that respectively correspond to actions performed by an entity or observations of the entity and (ii) each response data sample includes a respective outcome value of a response variable having a set of outcome values associated with the entity;

building a set of timing-prediction models from the training data, wherein building each timing-prediction model comprises training the timing-prediction model to predict a target event for a respective time bin within the training window, wherein the training window comprises two or more time bins and wherein at least two of the two or more time bins overlap;

generating timing-prediction model code configured to (i) compute a set of probabilities for the target event by applying the set of timing-prediction models to predictor variable data and (ii) compute a time of the target event from the set of probabilities; and outputting the timing-prediction model code to a host computing system that is configured for modifying a host system operation based on executing the timing-prediction model code to compute a time of the target event.

17. The non-transitory computer-readable medium of claim 16, wherein building the set of timing-prediction models comprises:

partitioning the training window into time bins, wherein the time bins include a first time bin for a first time period and a second time bin for a second time period, wherein the first time period and the second time period include an overlapping time period;

training a first timing-prediction model from the set of timing-prediction models to predict training target events from a first training data subset that includes predictor data samples limited to the first time bin and response data samples limited to the first time bin; and training a second timing-prediction model from the set of timing-prediction models to predict training target events from a second training data subset that includes predictor data samples limited to the second time bin and response data samples limited to the second time bin.

18. The non-transitory computer-readable medium of claim 17, further comprising iteratively adjusting each timing-prediction model to enforce a monotonic relationship between each predictor variable and the response variable, wherein the timing-prediction model code is further configured to compute, based on each timing-prediction model having the monotonic relationship, a set of explanatory codes including data describing contributions of the predictor variables to a probability for the target event.

19. The non-transitory computer-readable medium of claim 16, wherein modifying the host system operation based on the computed time of the target event comprises one or more of:

causing the host computing system or another computing system to control access to one or more interactive computing environments by a target entity associated with the predictor variable data, wherein the target event indicates a risk level associated with the target entity;

causing the host computing system or a web server to modify a functionality of an online interface provided to a third-party computing device associated with the target entity, wherein the target event indicates the risk level associated with the target entity; and causing the host computing system to output a recommendation to replace a hardware component in a set of machinery, wherein the target event indicates a risk of failure of the hardware component or malfunction associated with the hardware component.

20. The non-transitory computer-readable medium of claim 16, wherein the target event indicates a risk level associated with a target entity described by the predictor variable data, wherein modifying the host system operation based on the computed time of the target event comprises one or more of:

providing a computing device associated with the target entity with access to a permitted function of an interactive computing environment based on the risk level; and preventing the computing device associated with the target entity from accessing a restricted function of the interactive computing environment based on the risk level.

* * * * *